US010482287B2

(12) United States Patent
Kumar et al.

(10) Patent No.: US 10,482,287 B2
(45) Date of Patent: Nov. 19, 2019

(54) TRACKING AND FACILITATING RENEWAL OF DOCUMENTS USING AN ELECTRONIC SIGNATURE SYSTEM

(71) Applicant: Adobe Inc., San Jose, CA (US)

(72) Inventors: Divij Kumar, Delhi (IN); Neha Saxena, Delhi (IN); Aditya Kumar Pandey, Delhi (IN)

(73) Assignee: Adobe Inc., San Jose, CA (US)

( * ) Notice: Subject to any disclaimer, the term of this patent is extended or adjusted under 35 U.S.C. 154(b) by 376 days.

(21) Appl. No.: 14/799,300

(22) Filed: Jul. 14, 2015

(65) Prior Publication Data

US 2017/0017646 A1  Jan. 19, 2017

(51) Int. Cl.
*G06F 21/64* (2013.01)
*G06F 21/00* (2013.01)
*G06Q 10/10* (2012.01)

(52) U.S. Cl.
CPC .............. *G06F 21/64* (2013.01); *G06F 21/00* (2013.01); *G06Q 10/10* (2013.01)

(58) Field of Classification Search
CPC ....................................................... G06Q 10/00
See application file for complete search history.

(56) References Cited

U.S. PATENT DOCUMENTS

| 7,680,830 | B1 * | 3/2010 | Ohr ................... G06F 17/30085 707/999.2 |
| 8,910,067 | B1 | 12/2014 | Anderson |
| 9,117,116 | B1 | 8/2015 | Kothari et al. |
| 2005/0177716 | A1 * | 8/2005 | Ginter .................... G06F 21/10 713/157 |
| 2007/0016785 | A1 * | 1/2007 | Guay ................... H04L 9/3236 713/176 |
| 2008/0184033 | A1 | 7/2008 | Daniels et al. |
| 2009/0217047 | A1 * | 8/2009 | Akashika ................ G06F 21/33 713/175 |
| 2011/0184880 | A1 * | 7/2011 | Neumann .............. G06Q 30/06 705/344 |
| 2012/0259876 | A1 * | 10/2012 | Mathai ................... G06Q 10/06 707/756 |

OTHER PUBLICATIONS

U.S. Appl. No. 14/226,112, Jul. 17, 2015, Notice of Allowance.

* cited by examiner

*Primary Examiner* — Mark D Featherstone
*Assistant Examiner* — Tony Wu
(74) *Attorney, Agent, or Firm* — Keller Jolley Preece

(57) ABSTRACT

The present disclosure is directed toward systems and methods for managing electronic documents. For example, systems and methods described herein can enable parties to an agreement outlined in an electronic document to add, track, and save electronic signatures associated with the electronic document. Furthermore, systems and methods described herein automatically identify expiration information associated with the electronic document and generate alerts for the electronic document based on the expiration information.

20 Claims, 18 Drawing Sheets

Fig. 3F

TRACKING AND FACILITATING RENEWAL OF DOCUMENTS USING AN ELECTRONIC SIGNATURE SYSTEM

CROSS REFERENCE TO RELATED APPLICATIONS

N/A

BACKGROUND

1. Technical Field

One or more embodiments described herein relate generally to managing electronic documents. More specifically, one or more embodiments relate to tracking and facilitating renewal of documents using an electronic signature system.

2. Background and Relevant Art

Due to increased interconnectivity, electronic documents have become more popular and commonplace. It is no longer problematic for two geographically diverse parties to enter into an agreement because both parties can easily convert documents to an electronic format, and then send the converted documents over the Internet. For example, a business on one side of the country can enter into a contract with another business on the other side of the country merely by electronically signing the contract, and emailing the contract to the other business. In this way, parties can enter into software contract agreements, licensing agreements, maintenance and support agreements, rental agreements, insurance policy agreements, etc. without utilizing traditional paper copies of the various documents associated with these agreements.

The absence of traditional paper documents, however, becomes problematic in many respects. First, electronic documents are often easy to "misplace." To illustrate, after all parties have electronically signed an electronic document, one or more of the parties generally save the electronic document to a hard drive of a computer or to remote storage on a network (i.e., the Internet). Saving electronic documents, however, frequently gives rise to an "out of sight, out of mind" mentality in users. Thus, a user may save an electronic contract, only to later forget where the signed electronic contract is saved.

Next, without a traditional paper copy of a recurring contract or agreement (e.g., a lease agreement), a user often forgets when the recurring contract or agreement needs to be re-addressed. For example, an apartment complex manager may utilize electronic lease agreements with all of the apartment complex tenants. Each electronic lease agreement, however, may have different expiration dates. Accordingly, because the manager has no paper copies of the tenant's lease agreements, the manager may miss the expiration date of a particular tenant's lease. This could lead to the apartment complex missing out on an opportunity to re-sign a good tenant, or worse, to a problematic tenant staying beyond his original lease agreement.

Similarly, in other contexts, missing an expiration date associated with an electronic document can lead to a wide range of complications and missed opportunities. Despite this, electronic document users generally find the process of searching for electronic documents and checking expiration information associated with the individual documents to be a time-consuming hassle. As such, time-sensitive electronic documents are often missed.

Thus, there are several disadvantages to current methods for managing electronic documents.

SUMMARY

One or more embodiments described herein provide benefits and/or solve one or more of the foregoing or other problems in the art with systems and methods that provide users with efficient and effective user experiences when managing electronic documents. For example, one or more embodiments include systems and methods that allow for documents to be electronically signed and track and facilitate renewal of the electronically signed documents. Accordingly, systems and method described herein provide users with an easy way to track, sign, and renew electronic documents.

More particular, in one or more embodiments the systems and methods described herein identify expiration information associated with an electronically-signed electronic document. Additionally, systems and methods store the electronic document or metadata associated with the electronic document based on the identified expiration information in a manner to efficiently track and send notifications regarding renewal of the electronic document. Accordingly, systems and methods described herein can easily and automatically identify electronic documents with upcoming expiration dates and generate alerts for the identified electronic documents.

Additional features and advantages of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIGS. 3A-3M illustrate a series of user interfaces in connection with the document management system in accordance with one or more embodiments;

DETAILED DESCRIPTION

Figure 1:
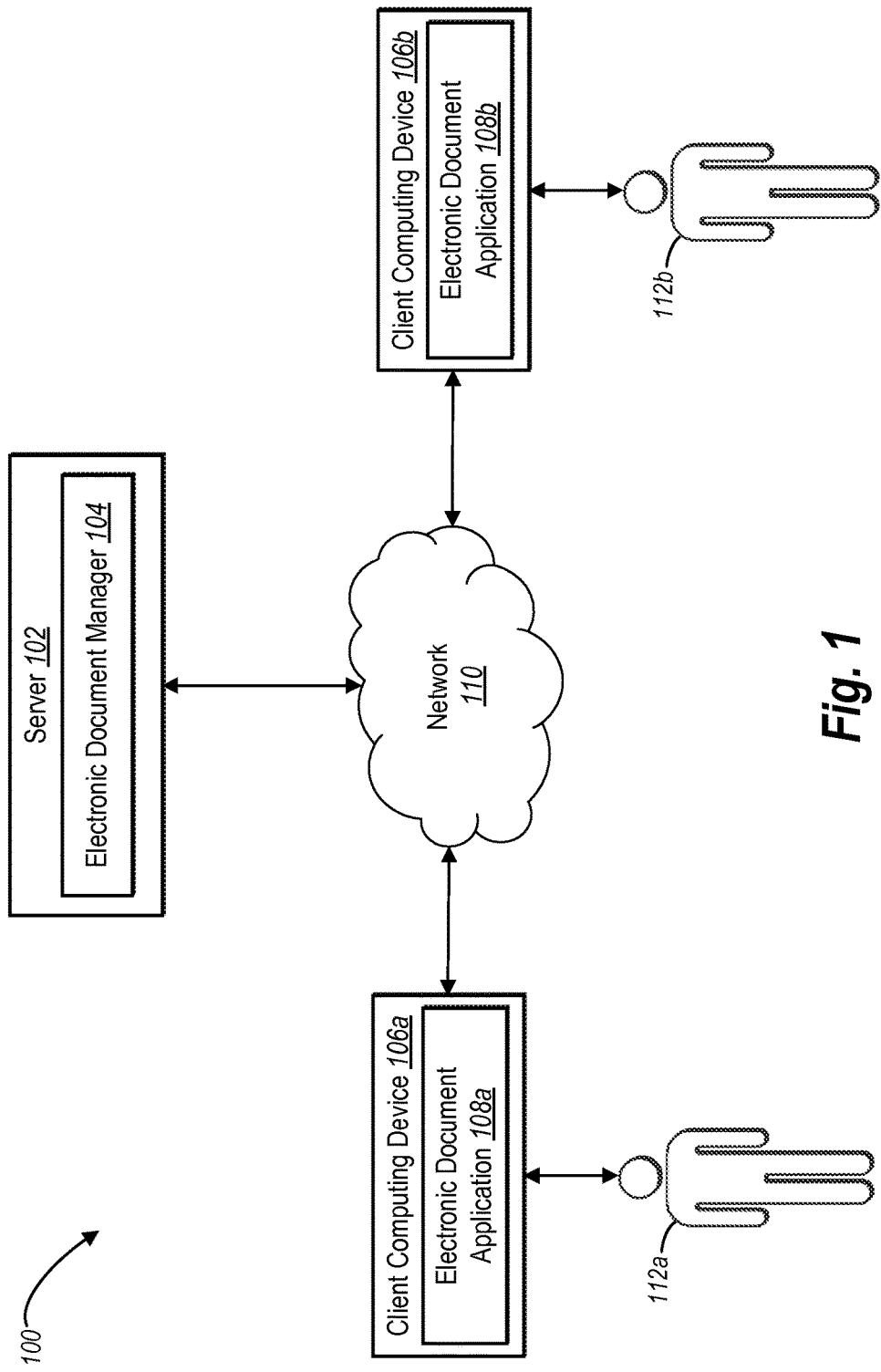
FIG. 1 illustrates a block diagram of an environment for implementing an document management system in accordance with one or more embodiments.

One or more embodiments described herein include an electronic document management system that organizes, analyzes, and communicates electronic documents. For example, the electronic document management system of one or more embodiments described herein can analyze an electronic document that includes expiration information in order to identify an expiration date associated with the electronic document. The electronic document management system can further organize and store electronic documents based on each document's expiration date. Thus, when an electronic document's expiration date approaches, the document management system can easily identify the electronic document and generate an alert related to the approaching expiration date. Furthermore, the electronic document management system can provide users with an option to automatically renew an electronic document that is set to expire.

To illustrate, two parties may decide to enter into a contract. Rather than wait on delivery of paper copies of the contract, the parties may utilize an electronic version of the contract that can be sent over the Internet. The electronic document management system can allow the parties to edit and update the electronic contract as desired and electronically sign the electronic contract.

In response to the signing of the electronic contract, the electronic document management system can analyze the electronic contract to identify various characteristics related to the electronic contract. For example, the electronic document management system can analyze the electronic contract to identify expiration information. In one or more embodiments, an electronic document, such as a contract, may include or otherwise be associated with expiration information that indicates when the electronic document is no longer valid or enforceable (i.e., when the agreement represented by the electronic document comes to an end). The electronic document management system can utilize various techniques, such as natural language processing, in order to identify an expiration date associated with the electronic document.

Once the electronic document management system has identified an expiration date associated with the electronically signed contract, the electronic document management system can store the electronically signed contract or metadata associated therewith based on the identified expiration date. For example, the electronic document management system can create storage nodes organized based on the expiration dates of electronically signed documents. In order to identify electronic documents that are due to expire, the electronic document management system can access nodes preceding the expiration dates of the various electronic documents. Thus, the electronic document management system can identify the electronically signed contract in enough time to offer the parties to the contract an opportunity to renew the agreement.

After identifying the electronic signed contract within a threshold amount of time before expiration, the electronic document management system can contact both parties to the contract and inform them that the contract is about to expire. The electronic document management system can then provide an option to renew the contract. In response to the parties selecting the option to renew the contract, the electronic document management system can update the original contract with a new expiration date and communicate the updated contract to both parties for electronic signing. In response to both parties signing the updated electronic contract, the electronic document management system can store the electronic contract again in accordance with the new expiration date. For example, the electronic document management system can copy the original contract. The electronic document management system can parse the contract to locate the expiration date, start date, term of the contract, and/or other expiration information. The electronic document management system can then update this the expiration date, start date, term of the contract, and/or other expiration information in the copy of the contract. The electronic document management system can then send the updated copy of the contract to the parties who signed original contract for signatures.

As used herein, the term "document" refers, in addition to its ordinary meaning, to any collection of information that can be communicated between users of the various systems disclosed herein. A document can take the form of a physical object, such as one or more papers containing printed information, or in the case of an "electronic document", a computer readable medium containing digital data. Electronic documents can be rendered in a variety of different ways, such as via display on a screen, by printing using an output device, or aurally using an audio player and/or text-to-speech software. Thus, it will be appreciated that electronic documents may include digital assets in addition to or instead of text; such digital assets may include, for example, audio clips, video clips, photographs, and other multimedia assets. Documents may encompass a virtually unlimited range of subject matter, including documents that contain terms that are to be agreed to amongst various participants in a given workflow. Examples of such documents include agreements, settlements, and legally binding contracts. For instance, both a word processing file containing the terms of a legally enforceable contract as well as a compressed audio file containing an audio recording of the same contract terms would both be considered "documents" for the purposes of this disclosure. Such textual and audio components may be combined into a single "document" in certain embodiments. Documents may be communicated amongst users by a variety of techniques ranging from physically moving papers containing printed matter to wired and/or wireless transmission of digital data. In one or more embodiments, an electronic document can be formatted in various ways (e.g., "portable document format" or "PDF"). Typically, a user can read an electronic document by opening the electronic document within a software program associated with the format of the electronic document.

Also as used herein, an "electronic signature" generally refers to an electronic sound, symbol, or process, attached to or logically associated with a contract or other record and executed or adopted by a person with the intent to sign the record. In one or more embodiments, an electronic signature reflects the fact that an electronic document is agreed to and legally executed. In at least one embodiment, an electronic signature can be embedded into an electronic document such that the electronic signature and the electronic document are no longer separable.

FIG. 1 is a schematic diagram illustrating an electronic document management system 100 in accordance with one or more embodiments. As illustrated in FIG. 1, the electronic document management system 100 may include users 112*a*, 112*b*, client-computing devices 106*a*, 106*b*, and a network 110 (e.g., the Internet). As further illustrated in FIG. 1, the client-computing devices 106a, 106b can communicate with a server 102 through the network 110. Although FIG. 1 illustrates a particular arrangement of the users 112a, 112b, the network 110, and the server 102, various additional arrangements are possible. For example, the client devices 106a, 106b may directly communicate with the server 102, bypassing the network 110. In one embodiment, as shown in FIG. 1, the server 102 hosting the electronic document manager 104 can be a single device. In additional or alternative embodiments, the server 102 can be a cluster of servers. In that case, the cluster of servers can use various protocols to communicate among the cluster. Furthermore, while FIG. 1 illustrates the device hosting the electronic document manager 104 as a server, in alternative embodiments the device hosting the electronic document manager 104 can comprise any type of computing device, such as a client computing device.

Figure 6:
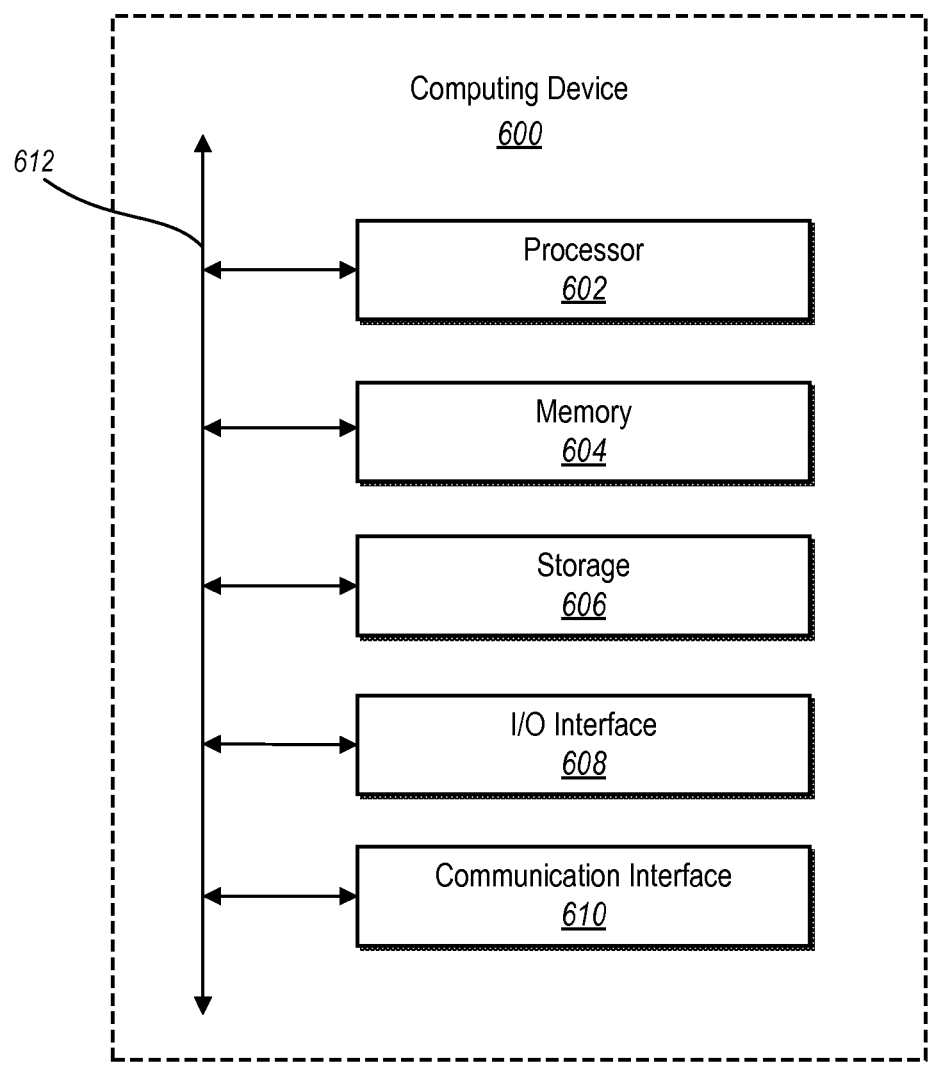
FIG. 6 illustrates a block diagram of an exemplary computing device in accordance with one or more embodiments.

While FIG. 1 illustrates two users 112a, 112b, the electronic document management system 100 can include more than two users. For example, the server 102 and the electronic document manager 104 thereon may manage data and electronic documents associated with some or all of the users 112a, 112b. Additionally, the electronic document manager 104 may manage data and electronic documents associated with other users associated with the server 102. Furthermore, in one or more embodiments, the users 112a, 112b interact with the client-computing devices 106a, 106b and the electronic document apps 108a, 108b thereon, respectively. Examples of client-computing devices may include, but are not limited to, mobile devices (e.g., smartphones, tablets, etc.), laptops, desktops, smart wearables (e.g., watches) or any other type of computing device. FIG. 6 and the associated text provide additional information regarding client-computing devices.

In one or more embodiments, the client-computing devices 106a, 106b communicate with the server 102 via the network 110. In one or more embodiments, the network 110 may include the Internet or World Wide Web. The network 110, however, can include various types of networks that use various communication technology and protocols, such as corporate intranet, a virtual private network ("VPN"), a local area network ("LAN"), a wireless local area network ("WLAN"), a cellular network, a wide area network ("WAN"), a metropolitan area network ("MAN"), or a combination of two or more such networks.

The electronic document management system 100 can allow users 112a, 112b to review and electronically sign an electronic document using an electronic document application 108a, 108b accessible via the client-computing devices 106a, 106b. Furthermore, the electronic document manager 104 can facilitate and track the sending, receiving, and electronic signing and/or archiving of the electronic document. Thus, the electronic document management system 100 can allow users to easily access, send, receive, and electronically sign documents despite a geographic distance between the users 112a, 112b.

In addition to the foregoing, as explained in greater detail below, an electronic document management system 100 can facilitate the renewal of an electronic document. In particular, the electronic document manager 104 can identify an expiration of an electronic document. The electronic document manager 104 can then send an alert to the users 112a, 112b via the electronic document applications (e.g., 108a, 108b) or other means (e.g., e-mail, text message, push notifications) that allows the users 112a, 112b to automatically renew the electronic document within a threshold amount of time of the identified expiration date.

Figure 2:
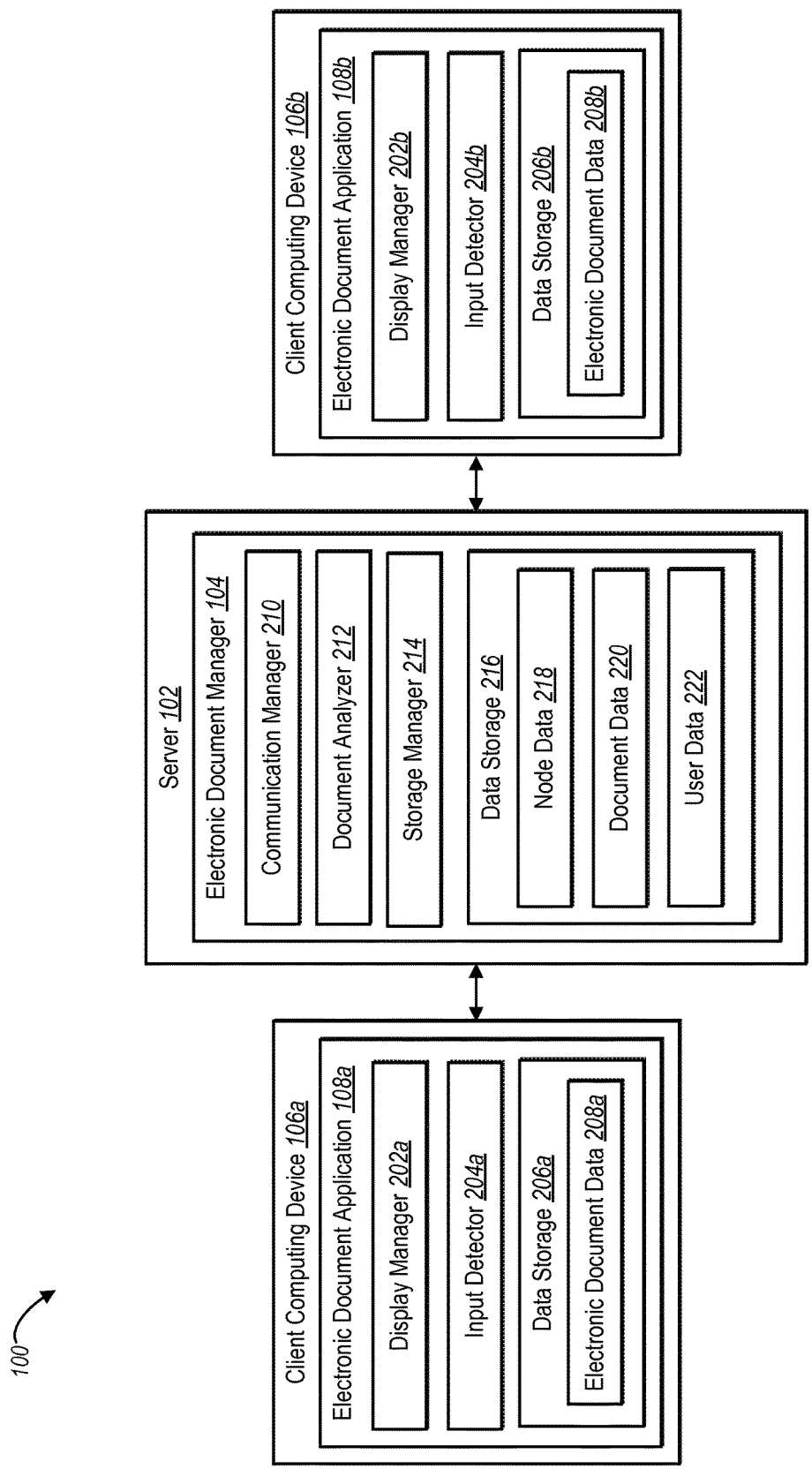
FIG. 2 illustrates a schematic diagram of the document management system of FIG. 1 in accordance with one or more embodiments.

FIG. 2 illustrates a schematic diagram illustrating an example embodiment of the electronic document management system 100. As shown, the electronic document management system 100 includes, but is not limited to, the server 102 communicatively coupled to the client-computing devices 106a, 106b. The server 102 includes the electronic document manager 104, which in turn includes, but is not limited to, a communication manager 210, a document analyzer 212, a storage manager 214, and a data storage 216. Although the disclosure herein shows the components 210-216 to be separate in FIG. 2, any of the components 210-216 may be combined into fewer components, such as into a single facility or module, or divided into more components as may serve one or more embodiments. In addition, the components 210-216 may be located on, or implemented by, one or more computing devices, such as those described below in relation to FIG. 6.

The components 210-216 can comprise software, hardware, or both. For example, the components 210-216 comprise one or more instructions stored on a computer readable storage medium and executable by a processor of one or more computer devices. When executed by the one or more processors, the computer-executable instructions of the electronic document management system 100 cause a computing device(s) to perform the methods described herein. Alternatively, the components 210-216 can comprise hardware, such as a special-purpose processing device to perform a certain function. Additionally or alternatively, the components 210-216 can comprise a combination of computer-executable instructions and hardware.

Additionally, the electronic document management system 100 includes the client-computing devices 106a, 106b running an electronic document application 108a, 108b. As shown in FIG. 2, the electronic document application 108a, 108b may include, but is not limited to, a display manager 202a, 202b, and input detector 204a, 204b, and a data storage 206a, 206b. In general, the electronic document management system 100 can allow a user of the client-computing device 106a, 106b to utilize the server 102 and the electronic document manager 104 thereon to manage and access electronic documents. Furthermore, in some embodiments, the electronic document application 108a, 108b can include or leverage various background services that assist in completing pending tasks (e.g., storage tasks, uploading tasks, downloading tasks, notification tasks).

The components 202a, 202b through 206a, 206b can comprise software, hardware, or both. For example, the components 202a, 202b through 206a, 206b comprise computer instructions stored on a non-transitory computer-readable storage medium and executable by at least one processor of the client-computing device 106a, 106b. When executed by at least one processor, the computer-executable instructions cause the client-computing device 106a, 106b to perform the methods and processes described herein. Alternatively, the components 202a, 202b through 206a, 206b can comprise hardware, such as a special purpose processing device to perform a certain function or group of functions. Additionally or alternatively, the components 202a, 202b through 206a, 206b can comprise a combination of computer-executable instructions and hardware.

In one or more embodiments, the electronic document application 108a, 108b can be a native application installed on the client-computing device 106a, 106b. For example, the electronic document application 108a, 108b may be a mobile application that installs and runs on a mobile device, such as a smart phone or a tablet or a smart wearable (e.g. watch). Alternatively, the electronic document application 108a, 108b can be a desktop application, widget, or other form of a native computer program. Alternatively, the electronic document application 108a, 108b may be a remote application that the client-computing device 106a, 106b accesses. For example, the electronic document application 108a, 108b may be a web application that is executed within a web browser of the client-computing device 106a, 106b.

As mentioned above, and as shown in FIG. 2, the electronic document application 108a, 108b can include a display manager 202a, 202b. The display manager 202a, 202b can provide, manage, and/or control a graphical user interface (or simply "user interface") that allows a user to perform analysis and receiving information from the electronic document manager 104. For example, the display manager 202a, 202b provides a user interface that facilitates interactions with a display. Likewise, the display manager 202a, 202b can provide a user interface that displays information received from the electronic document manager 104.

More specifically, the display manager 202a, 202b facilitates the display of a user interface (e.g., by way of a display device associated with the client-computing device 106a, 106b). For example, the user interface composes a plurality of graphical components, objects, and/or elements that allow a user to interact with the electronic document manager 104. More particularly, the display manager 202a, 202b directs the client-computing device 106a, 106b to display a group of graphical components, objects and/or elements as directed by the electronic document manager 104, as will be described further below.

As further illustrated in FIG. 2, the electronic document application 108a, 108b includes an input detector 204a, 204b. In one or more embodiments, the input detector 204a, 204b detects, receives, and/or facilitates user input in any suitable manner. In some examples, the input detector 204a, 204b detects one or more user interactions with respect to the user interface. As referred to herein, a "user interaction" means a single interaction, or combination of interactions, received from a user by way of one or more input devices.

For example, the input detector 204a, 204b detects a user interaction from a keyboard, mouse, touch pad, touch screen, and/or any other input device. In the event the client-computing device 106a, 106b includes a touch screen, the input detector 204a, 204b can detect one or more touch gestures (e.g., swipe gestures, tap gestures, pinch gestures, or reverse pinch gestures) that form a user interaction. In some examples, a user provides the touch gestures in relation to, and/or directed at, one or more graphical objects or graphical elements of a user interface.

The input detector 204a, 204b may additionally, or alternatively, receive data representative of a user interaction. For example, the input detector 204a, 204b may receive one or more user configurable parameters from a user, one or more user commands from the user, and/or any other suitable user input. The input detector 204a, 204b may receive input data from one or more components of the electronic document application 108a, 108b, from the storage on the client-computing device 106a, 106b, or from one or more remote locations (e.g., the electronic document manager 104).

The electronic document application 108a, 108b can perform one or more functions in response to the input detector 204a, 204b detecting user input and/or receiving other data. Generally, a user can control, navigate, and otherwise use the electronic document application 108a, 108b by providing one or more user inputs that the input detector 204a, 204b detects. For example, in response to the input detector 204a, 204b detecting user input, one or more components of the electronic document application 108a, 108b allow the user to view data, interact with various controls, or submit requests. In addition, in response to the input detector 204a, 204b detecting user input, one or more components of the electronic document application 108a, 108b allow a user to navigate through one or more user interfaces to configure, edit, send, sign, or receive an electronic document.

In one or more embodiments, in response to the input detector 204a, 204b detecting one or more user inputs, the electronic document application 108a, 108b facilitates the electronic document manager 104 in assisting the user in configuring or editing an electronic document. For example, a user may provide input (e.g., via a button click, a list item selection, a drag-and-drop, etc.) indicating an update or change to an electronic document. In response to the input detector 204a, 204b detecting the input, the electronic document manager 104 can take appropriate action in response to the detected user input.

Also as mentioned above, and as illustrated in FIG. 2, the electronic document application 108a, 108b also includes a data storage 206a, 206b. The data storage 206a, 206b stores and maintains electronic document data 208a, 208b representative of electronic document information such as, but not limited to, electronic document edits, electronic document content, electronic document senders and recipients, etc. In one or more embodiments, a user of the electronic document application 108a, 108b can search, review, export, or share the information within the data storage 208a, 208b.

As discussed above, and as shown in FIG. 2, the server 102 can include the electronic document manager 104. The electronic document manager 104 can handle, communicate, configure, store, analyze, display, and otherwise manage electronic documents. Additionally, the electronic document manager 104 can configure and provide a variety of displays or APIs that assist a user in sending, receiving, editing, and updating electronic documents.

Also as mentioned above, the electronic document manager 104 includes a communication manager 210. In one or more embodiments, the communication manager 210 can send and receive electronic documents. For example, a user of the electronic document manager 104 can upload or transfer an electronic document to the electronic document manager 104. Accordingly, the communication manager 210 can receive uploaded or transferred documents from a client-computing device (e.g., the client-computing device 106a) associated with a particular user (e.g., the user 112a).

Additionally, the communication manager 210 can send electronic documents to other users. For example, after uploading an electronic document to the electronic document manager 104, a sending user may utilize the electronic document manager 104 to send the electronic document to another user (e.g., the user 112b of the client-computing device 106b). Accordingly, in one or more embodiments, the communication manager 210 can also receive recipient information from the sending user. For instance, when uploading or selecting an electronic document to send to a recipient, the sending user can specify an email address, file transfer protocol ("FTP") address, website endpoint, etc. associated with the recipient. In at least one embodiment, the communication manager 210 can send the uploaded or selected electronic document to the recipient based on the specified recipient information. In one or more alternative embodiments, rather than sending the electronic document to a specified recipient, the communication manager 210 may simply inform the recipient that there is an electronic document awaiting review or other action, or send its network location.

In addition to receiving an electronic document, the communication manager 210 can also receive metadata associated with an electronic document. As used herein, "metadata" refers to data that describes or is associated with the electronic document. In one or more embodiments, when a sender uploads or otherwise provides an electronic document to the electronic document manager 104, the sender can provide additional information (e.g., metadata) associated with the electronic document. For example, the sender can provide recipient information (e.g., recipient name, recipient email address, other recipient identifier, etc.), sender information (e.g., sender name, sender email address, etc.), and a specific delivery date/time when the communication manager 210 should send the electronic document to the recipient, etc.

The communication manager 210 can also receive metadata associated with the electronic document that is intrinsic to the electronic document, and not provided by the sender. For example, the communication manager 210 can receive electronic document metadata including, but not limited to, the size of the electronic document, the file type of the electronic document, a file history associated with the electronic document indicating when the electronic document was created, edited, or accessed, its author, unique document identifier, location, or time zone where document was created etc. In one or more embodiments, the communication manager 210 can store metadata associated with an electronic document in the data storage 216.

In addition to sending and receiving electronic documents and associated metadata, the communication manager 210 can also generate and send communications to users of the electronic document manager 104. For example, in one embodiment, the communication manager 210 generates and sends status updates related to an electronic document that needs to be signed. In that case, the communication manager 210 can generate emails informing the electronic document sender that the electronic document has been sent to the recipient, that the recipient has accessed the electronic document, and that the recipient has electronically signed the electronic document. Similarly, the communication manager 210 can generate emails informing the electronic document recipient that there is an electronic document that has been sent, or is awaiting review or other action, that the recipient's electronic signature or other edits have successfully been added to an electronic document, or that the electronic document sender has received or reviewed the recipient's electronic signature or other edits. In additional or alternative embodiments, the communication manager 210 can generate and send communications via live web chat, SMS texts, automated telephone calls, social media messages, pop-up notifications, etc.

Furthermore, the communication manager 210 can generate and send communications related to an electronic document's expiration status. As mentioned above, the electronic document manager 104 can identify electronic documents that are associated with expiration information indicating an upcoming expiration date. In response to identifying an electronic document with an upcoming expiration date, the communication manager 210 can generate and send a communication to the original sender and/or parties associated with the electronic document to alert the sender and/or parties of the upcoming expiration date, and to inquire as to whether there is a desire to renew the electronic document. In one or more embodiments, the communication manager 210 includes interactive controls, hyperlinks, text, images, or other multimedia in a generated communication in order to clearly communicate with the parties associated with an electronic document.

As mentioned above, and as illustrated in FIG. 2, the electronic document manager 210 also includes a document analyzer 212. In one or more embodiments, the document analyzer 212 identifies expiration information associated with an electronic document. As mentioned above, certain electronic documents (e.g., leases, purchase agreements, etc.) are associated with a date when the agreement described in the electronic document ends or is no longer valid. For example, a lease agreement for an apartment rental may include an expiration term of one year. In other words, the parties who sign the lease agreement understand that in one year from the date the lease agreement is signed, the lease will no longer be valid.

In order to identify expiration information associated with an electronic document, the document analyzer 212 can utilize natural language processing techniques. In one or more embodiments, the document analyzer 212 parses the electronic document into discrete sections (e.g., words, phrases, sentences, etc.) and utilizes natural language processing to identify a date of expiration within one or more of the discrete sections. For example, the document analyzer 212 may parse and process a section of an electronic document to identify a phrase such as, "this agreement expires on Dec. 31, 2015." Additionally or alternatively, the document analyzer 212 may parse and process several sections to identify phrases such as "this contract expires in one year from today," and "this contract was signed Dec. 31, 2015." In that case, the document analyzer 212 can utilize machine learning to determine that the expiration date associated with the electronic document is Dec. 31, 2016. The document analyzer 212 can further utilize optical character recognition, databases, grammars, Internet lookups, etc. in identifying expiration information associated with an electronic document.

Furthermore, the document analyzer 212 can analyze metadata associated with an electronic document to identify expiration information. In one or more embodiments, an electronic document sender explicitly provides, within the metadata associated with the electronic document, an expiration date for the electronic document. In that case, the document analyzer 212 can simply identify the explicitly provided expiration date for the electronic data. In other embodiments, the metadata associated with an electronic document includes information such as a length of time associated with the validity of the electronic document (e.g., one year), and a date associated with when an electronic signature was added to the electronic document. From this metadata, the document analyzer 212 can utilize machine learning to determine an expiration date associated with an electronic document.

Additionally, in response to one or more parties associated with an electronic document selecting an option to renew an expiring document, the document analyzer 212 can update the electronic document with new expiration information. For example, as described above, the document analyzer 212 parses an electronic document to identify an expiration date associated with the electronic document. Thus, in response to one or more parties associated with the electronic document selecting an option to renew the electronic document, the document analyzer 212 determines a new expiration date, and updates the parsed portions of the electronic document containing expiration information with the new start and expiration date.

In one or more embodiments, the document analyzer 212 determines a new expiration date by identifying the current expiration date (e.g., via one or more of the methods described above), and by identifying a term associated with the electronic document. For example, the electronic document may contain text indicating that the agreement outlined in the electronic document expires in six months, a year, two years, etc. Thus, the length of time in between the execution of an agreement and its expiration date is the term of the agreement. Once the document analyzer 212 identifies both the current expiration date and the term associated with the electronic document, the document analyzer 212 can determine the new expiration date for the electronic document by simply adding the term to the current expiration date.

Furthermore, the document analyzer 212 can create a copy of the electronic document with the new expiration date, and update the metadata associated with the electronic document with the new expiration date. In one or more embodiments, the document analyzer 212 can create a copy the electronic document including the new expiration date by parsing the electronic document to identify document segments including current expiration information, as described above, update the expiration information identified from the electronic document, and replacing the current expiration information with the updated expiration information in the copy of the electronic document. Thus, over time, the document analyzer 212 can create a trail of related electronic documents. Additionally, creating a copy of the electronic document with the new expiration information rather than updating the original electronic document ensures the original electronic document is preserved.

In at least one embodiment, the document analyzer 212 utilizes machine learning to conjugate, rephrase, or restructure the new expiration date such that the new expiration date is in the correct format to replace the current expiration information. For example, if the electronic document contains phrases such as "this contract expires in one year from today," and "this contract was signed Dec. 31, 2015," the document analyzer 212 can simply update the date on which the contract was signed to the current date. In another example, if the electronic document contains the phrase "this agreement expires on Dec. 31, 2015," the document analyzer 212 can simply replace "Dec. 31, 2015," with "Dec. 31, 2016."

The document analyzer 212 can also identify one or more types associated with an electronic document. In one or more embodiments, certain types of electronic documents generally include type indicators. For example, an electronic document of a "lease" type includes indicators such as, but not limited to, formatting (e.g., numbered paragraphs followed by signature lines), language (e.g., language describing a property, language identifying a landlord and/or tenant, language describing various responsibilities associated with the property), etc. Another electronic document of a "delivery contract" type may include the same formatting indicators as the "lease" type electronic document, but may include different language indicators (e.g., language describing certain goods, language describing delivery terms, language describing how the contract may be breached), etc. Accordingly, in one or more embodiments, the document analyzer 212 can utilize natural language processing, machine learning, neural networks, etc. to identify indicators in an electronic document, and determine a type associated with the electronic document.

After identifying a type associated with an electronic document, the document analyzer 212 can confirm whether the electronic document's identified expiration date is accurate. As described above, the document analyzer 212 can identify an electronic document's expiration date by parsing the electronic document and utilizing natural language processing and other techniques to identify expiration information among the parsed sections of the electronic document. In some cases, the document analyzer 212 may identify several dates associated with the electronic document with no clear indication as to which date is the expiration date for the electronic document. In one or more embodiments, the document analyzer 212 can utilize an electronic document's type to confirm whether an identified date within the electronic document is the electronic document's expiration date.

For example, the document analyzer 212 may identify an electronic document's type as "lease." The document analyzer 212 may also determine that the electronic document includes two different dates, one that is a month away from the current date and one that is a year away from the current date, with no clear indication as to which date is the expiration date associated with the electronic document. The document analyzer 212 can then confirm that, based on the electronic document's type as "lease," the date that is a year away from the current date is the expiration date associated with the electronic document based on machine learning from other documents identified as "leases."

In additional or alternative embodiments, the document analyzer 212 can identify a type of an electronic document prior to parsing the electronic document for expiration information. In that case, the document analyzer 212 can identify a type of the electronic document, and then parse the electronic document based on the identified type. For example, the document analyzer 212 can identify an electronic document as a "lease" type. Based on the identified type, the document analyzer 212 may parse the first few first pages of the electronic document in light of the fact that expiration information is generally included on the first pages of "lease" type documents. The document analyzer 212 may analyze the first few pages of the electronic document for expiration indicators. In additional or alternative embodiments, the document analyzer 212 may analyze the entire document for expiration indicators. The expiration indicators can include words/phrases/clauses (e.g., "expire," "ends," "lease expires on"), formatting (e.g., combinations of numbers and letters such as "Jan. 1, 2016"), and so forth based on machine learning from other lease documents.

As mentioned above, and as illustrated in FIG. 2, the electronic document manager 104 also includes the storage manager 214. In one or more embodiments, the storage manager 214 can store electronic documents as well as information associated with the electronic documents. Furthermore, the storage manager 214 can also retrieve electronic documents and information associated with the electronic documents.

In order to store an electronic document and its associated metadata, the storage manager 214 can create storage nodes. In one or more embodiments, the storage manager 214 can store the storage node as part of a tree, database, table, linked list, hash table, or any other similar storage construct. The storage manager 214 may include the electronic document and its associated metadata in the storage nodes, and can index the storage node within or outside the appropriate storage construct based on the identified expiration date associated with the electronic document. For example, if the storage construct is a hash table, the storage manager 214 can place the created storage node in a bucket where the applicable expiration date is the key for that bucket.

Also, as mentioned above, the storage manager 214 can retrieve storage nodes including electronic documents and metadata. In one or more embodiments, the storage manager 214 performs storage lookups at regular intervals (e.g., daily, weekly, monthly) to identify storage nodes that are indexed at dates that are within a threshold amount of time from the date of the storage lookup (e.g., within a week, within a month, within a year, etc.). For example, the storage manager 214 can perform a storage lookup on June $1^{st}$ for all storage nodes that are indexed at a date that is thirty days away from June $1^{st}$. Accordingly, in that example, the storage manager 214 would identify all storage nodes that are indexed at July $1^{st}$. As discussed above, the storage nods that are indexed at July $1^{st}$ also expire on July $1^{st}$. Also as mentioned above, in response to identifying a storage node with an upcoming expiration date, the communication manager 210 can send alert to all parties associated with the electronic document stored in the storage node.

Furthermore, the storage manager 214 can create an audit log that includes entries associated with each time a particular storage node was accessed. For example, the storage manager 214 can create an audit log associated with a particular storage node that includes entries for when the storage manager 214 created the storage node, when the storage manager 214 accessed the storage node (i.e., because the storage node was set to expire), when the storage manager 214 updated the storage node with a renewed version of the electronic document, etc. In this way, the electronic document manager 104 can provide a full accounting of an electronic document and its associated metadata if needed.

Also as mentioned above, and as illustrated in FIG. 2, the electronic document manager 104 includes a data storage 216. The data storage 216 can store and maintain node data 218, document data 220, and user data 222. In one or more embodiments, the node data 218 is representative of a plurality of storage node information. Also in one or more embodiments, the document data 220 is representative of electronic document information. Furthermore, in one or more embodiments, the user data 222 is representative of user information associated with users of the electronic document manager 104.

As will be described in more detail below, the components of the electronic document management system 100 as described with regard to FIGS. 1 and 2 can provide, along and/or in combination with other components, one or more graphical user interfaces ("GUIs"). In particular, the components can allow a user to interact with a collection of display elements for a variety of purposes. Specifically, FIGS. 3A-3M and the description that follows illustrate various example embodiments of GUIs and features that are in accordance with general principles as described above.

As described above, the electronic document manager 104 can manage electronic document storage, editing, and alerts in a networking environment. It will be noted that while the functionality of the electronic document manager 104 is described in FIGS. 3A-3M within the context of a native application, in additional embodiments, the functionality of the electronic document manager 104 can apply to other network environments. For example, the electronic document manager 104 can provide GUIs as part of a website for display in connection with a web browser.

Figure 3A:
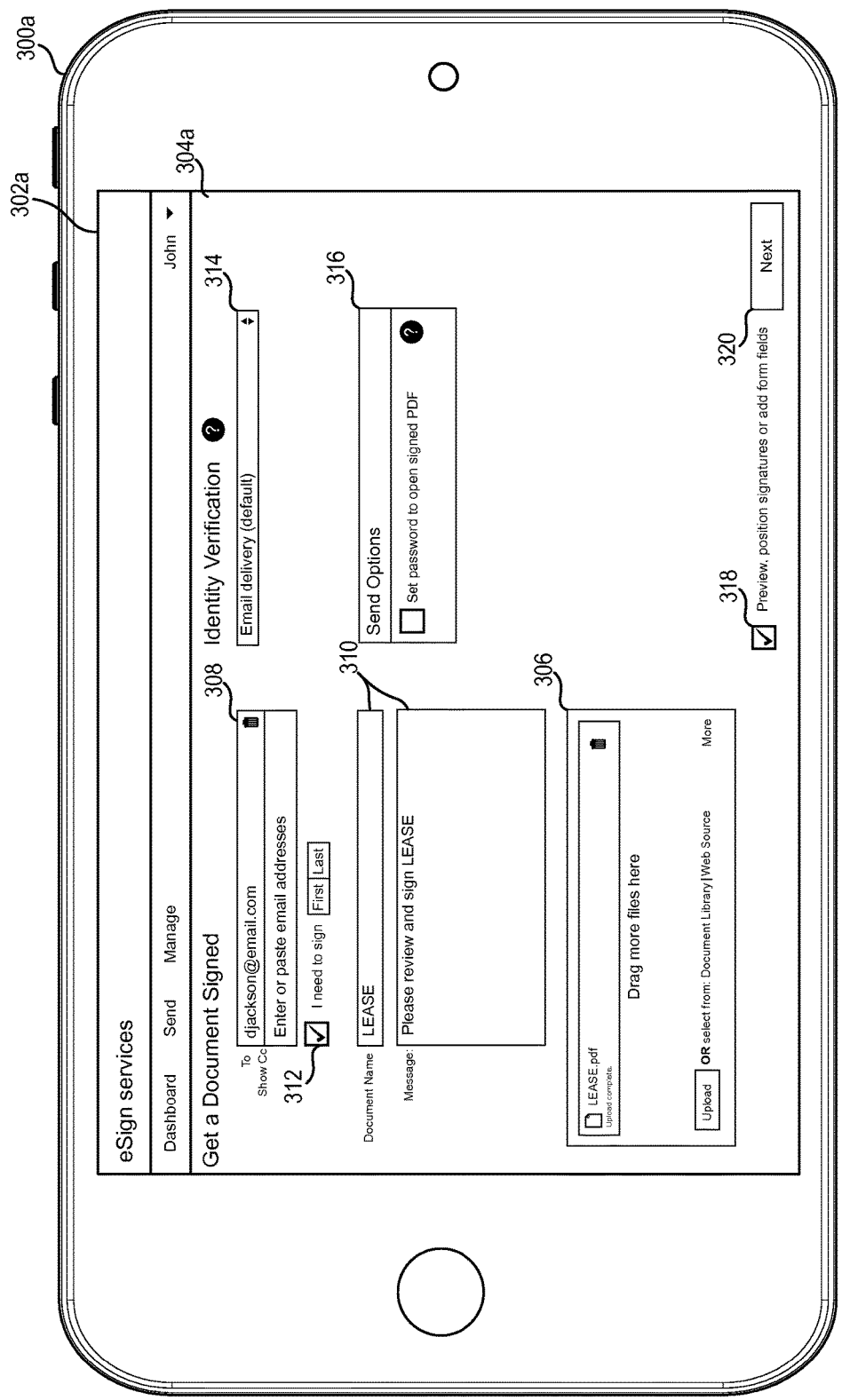

For example, FIGS. 3A-3M illustrate various views of GUIs provided at the client-computing devices 106a, 106b by way of the electronic document application 108a, 108b. As mentioned above, in some embodiments, a client-computing device (i.e., the client-computing device 106a, 106b) can implement and/or provide features from the electronic document management system 100. For example, FIG. 3A illustrates a client-computing device 300a (i.e., the client-computing device 106a) of a user (i.e., the user 112a) that may implement one or more of the components or features of the electronic document manager 104. As shown, the client-computing device 300a is a handheld device, such as a tablet computer. As used herein, the term "handheld device" refers to a device sized and configured to be held in a single hand of a user. In additional or alternative examples, however, any other suitable computing device, such as, but not limited to, a mobile phone, larger wireless device, laptop or desktop computer, a personal digital assistant device, a smart wearable (e.g. watch) and/or any other suitable computing device can perform one or more of the processes and/or operations described herein.

As illustrated in FIG. 3A, the client-computing device 300a, includes a touch screen display 302a that can display user interfaces and by way of which user input may be received and/or detected. As used herein, a "touch screen display" refers to the display of a touch screen device. In one or more embodiments, a touch screen device may be the client-computing device 106a with at least one surface upon which a user may perform touch gestures (e.g., a laptop, a tablet computer, a personal digital assistant, a media player, a mobile phone, etc.). Additionally or alternatively, the client-computing device 300a may include any other suitable input device, such as a touch pad or those described below in reference to FIG. 6.

As described above, an electronic document owner (e.g., the user 112a) can begin the process of having a recipient electronically sign the electronic document via the electronic document manager 104 by first uploading the electronic document to the electronic document manager 104. Thus, as illustrated in FIG. 3A, the electronic document manager 104 can provide an upload GUI 304a on a touch screen display 302 of a client-computing device 300 associated with the electronic document owner (e.g., the client-computing device 106a). In one or more embodiments, the upload GUI 304a can include various controls to assist an electronic document owner in uploading an electronic document and in providing extra information that the system 100 can associate with the electronic document (e.g., as metadata). In additional or alternative embodiments, the upload GUI 304a can include various controls to assist the electronic document owner in selecting an electronic document from an online repository, rather than uploading the electronic document from the client-computing device 300a.

An electronic document owner can begin by utilizing the upload control 306 to indicate an electronic document (i.e., "LEASE.pdf") to upload to the electronic document manager 104. In one or more embodiments, the electronic document owner can simply drag-and-drop a file from a file browser of the client-computing device 300a to the upload control 306. In additional or alternative embodiments, the upload control 306 can present a file selection dialog box in order for the electronic document owner to select an electronic document for uploading. Although the upload control 306 is shown in FIG. 3A with only one electronic document indicated, in additional or alternative embodiment, the electronic document owner could use the upload control 306 to upload multiple electronic documents.

Next, in order to indicate a recipient for the uploaded electronic document, the electronic document owner can specify a recipient via the recipient control 308. As shown in FIG. 3A, the recipient control 308 allows the electronic document owner to specify one or more recipients (i.e., "jsmith@email.com") for the uploaded electronic document. Although the recipient control 308 is shown as accepting email addresses in FIG. 3A, in additional or alternative embodiments, the recipient control 308 can accept FTP addresses, social media screen names, website endpoints, phone numbers, etc. It will be noted that, as used herein, a "recipient" of an electronic document can simply mean an additional party who is granted access to an electronic document uploaded to the electronic document manager 104.

To add a name, a note, or extra instructions to the uploaded electronic document, the electronic document owner can utilize the instruction control 310. As illustrated in FIG. 3A, the instruction control 310 can include various text input boxes to add a name to the electronic document (e.g., if the document owner wishes to give the electronic a different name than the file name of the uploaded electronic document), as well as to add a message associated with the uploaded electronic document. In one or more embodiments, the text added to the instruction control 310 will be included in an email sent to the electronic document recipient. Additionally or alternatively, the electronic document manager 104 can add the text from the instruction control 310 to the metadata associated with the uploaded electronic document.

The document owner can further specify additional instructions and options via the signer option control 312, the identity verification control 314, and the additional options control 316. For example, as illustrated in FIG. 3A, the document owner can indicate via the checkbox associated with the signer option control 312 that the electronic document requires the document owner's signature either before or after the electronic document is signed by the recipient. In at least one embodiment, the document owner can indicate via the identity verification control 314 how a recipient can verify his identity. For example, the recipient control 308 can comprise an e-mail address, an FTP endpoint, social media account, etc. Finally, the document owner can specify various additional options (e.g., a password lock, delivery confirmation emails, encryption settings) via the additional options control 316.

In some embodiments, the document owner simply sends the electronic document to the recipient after configuring the various controls included in the upload GUI 304a, as shown in FIG. 3A. Alternatively, the electronic document manager 104 can enable the document owner to further edit and/or preview the uploaded electronic document before sending the electronic document to the recipient in response to the document owner selecting the checkbox associated with the edit control 318, and clicking the next button 320. For example, in response to the document owner selecting the checkbox associated with the edit control 318 and clicking the next button 320, the electronic document manager 104 can provide an edit GUI 304b on the touch screen display 302 of the client-computing device 300a, as shown in FIG. 3B.

Figure 3B:
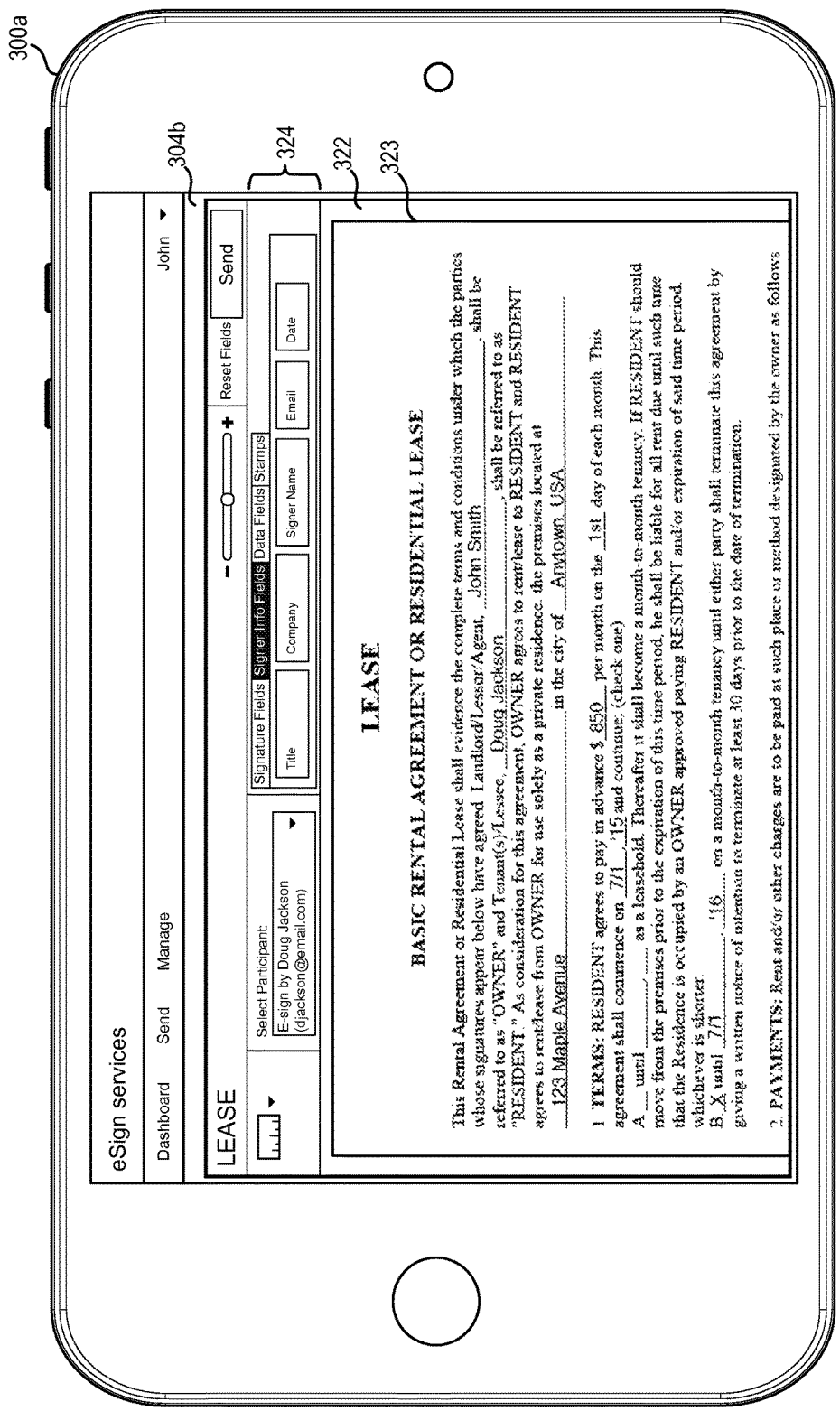

As shown in FIG. 3B, the edit GUI 304b can include an electronic document edit control 322. In one or more embodiments, the electronic document manager 104 can provide the uploaded electronic document 323 (i.e., the "LEASE.pdf") in the electronic document edit control 322. For example, in order to provide the uploaded electronic document 323 in the electronic document edit control 322, the electronic document manager 104 can open and load the file, or a rendition thereof, associated with the uploaded electronic document 323 in the electronic document edit control 322.

Figure 3C:
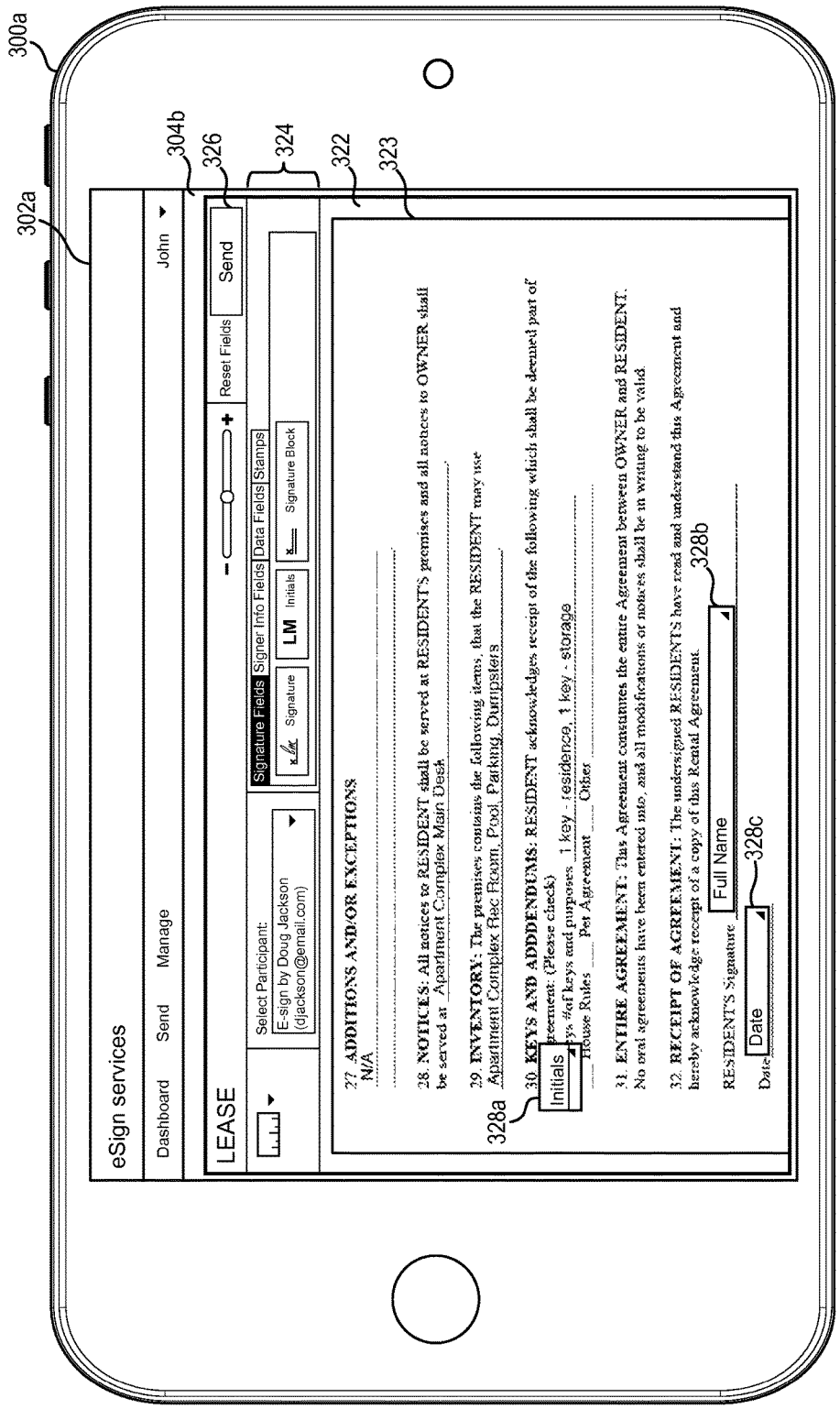

The electronic document manager 104 can also provide the edit options control 324 as part of the edit GUI 304b. In one or more embodiments the edit options control 324 includes various buttons, drop-down list boxes, checkboxes, etc. that provide the electronic document owner with various options for editing and/or adding to the uploaded electronic document 323. For example, after scrolling to the bottom of the uploaded electronic document 323 in the electronic document edit control 322, as shown in FIG. 3C, the electronic document owner can drag-and-drop a signature field from the edit options control 324 onto the uploaded electronic document 323 in order to add interactive signature fields 328a, 328b, and 328c. In one or more embodiments, the electronic document manager 104 layers each added signature field 328a, 328b, 328c onto the uploaded electronic document 323 such that additional information can be added to the uploaded electronic document by the electronic document owner, or the eventual recipient of the electronic document. The drag-and-drop elements listed in the edit options control 324 can allow the electronic document owner to add interactive controls for signatures, initials, dates, notes, stamps, highlights, etc. to the uploaded electronic document 323.

Once the electronic document owner has sufficiently edited and previewed the uploaded electronic document 323, the electronic document owner can initiate sending the uploaded electronic document 323 to the recipient by clicking the send button 326, as shown in FIG. 3C. In response to the electronic document owner clicking the send button 326, the electronic document manager 104 can embed or otherwise save the added signature fields 328a, 328b, and 328c into the uploaded electronic document 323. Additionally, the communication manager 210 can send the uploaded electronic document 323 according to the options set forth by the electronic document owner in the upload GUI 304a.

Figure 3D:
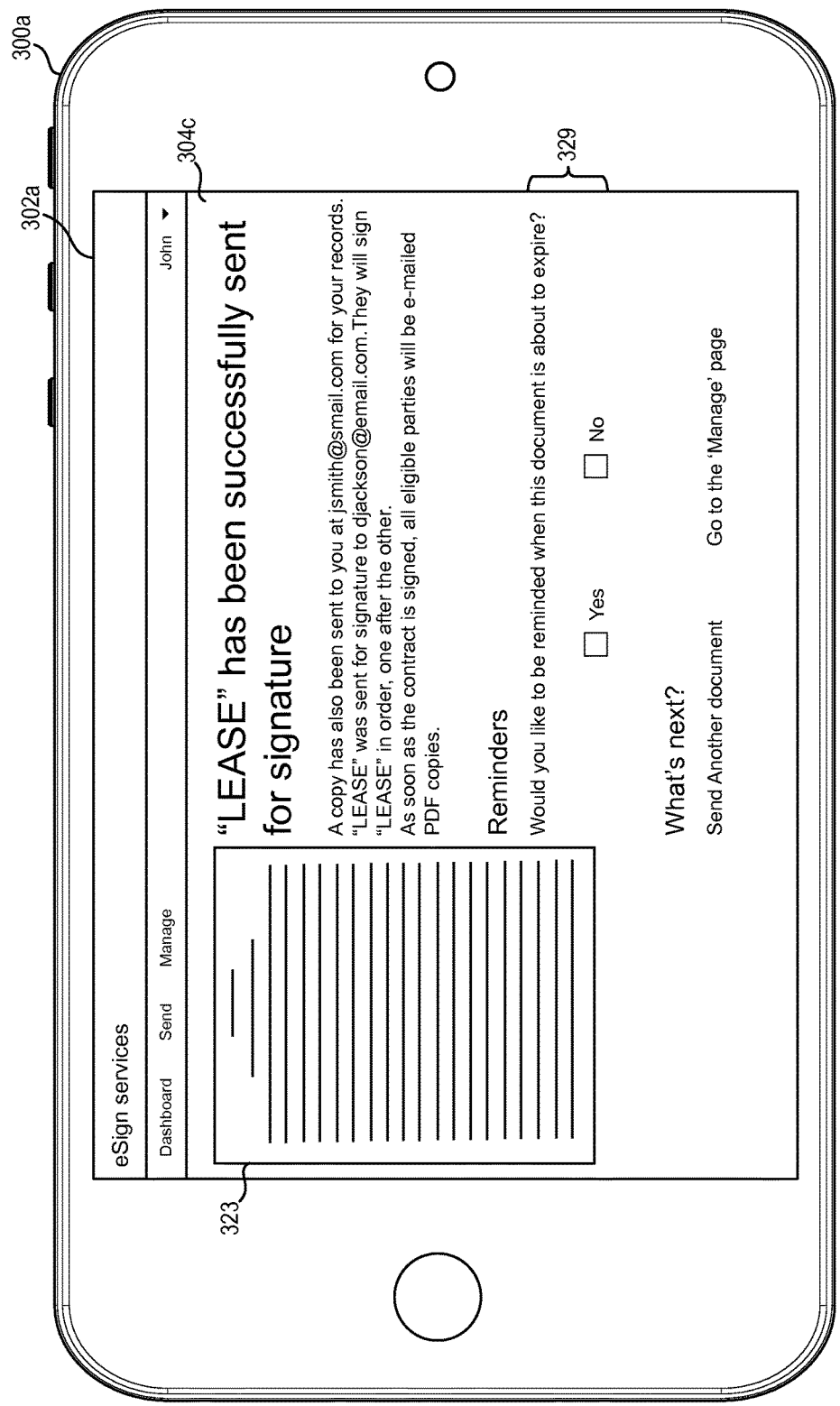

As mentioned above, the communication manager 210 can generate and provide communications regarding the status of an electronic document. Accordingly, as shown in FIG. 3D and in response to the communication manager 210 successfully sending the uploaded electronic document 323 to the recipient, the communication manager 210 can provide a confirmation GUI 304c on the touch screen display 302a of the client-computing device 300a. In one or more embodiments, the confirmation GUI 304c can include a message informing the electronic document owner that the uploaded electronic document 323 has been successfully sent to the recipient, instructions regarding next steps, and a minimized preview of the uploaded electronic document 323. Furthermore, in at least one embodiment, the confirmation GUI 304c includes a reminder control 329 by way of which the electronic document owner can specify whether expiration reminders are desired. As will be described in greater detail below, in response to the electronic document owner indicating that expiration reminders are desired, the electronic document manager 104 can generate and provide reminders or alerts that the uploaded electronic document 323 is about to expire and provide options for the electronic document owner and recipient to renew the electronic document. In at least one embodiment, the storage manager 214 stores the document owner's input through the reminder control 329 as metadata associated with the uploaded electronic document 323.

Figure 3E:
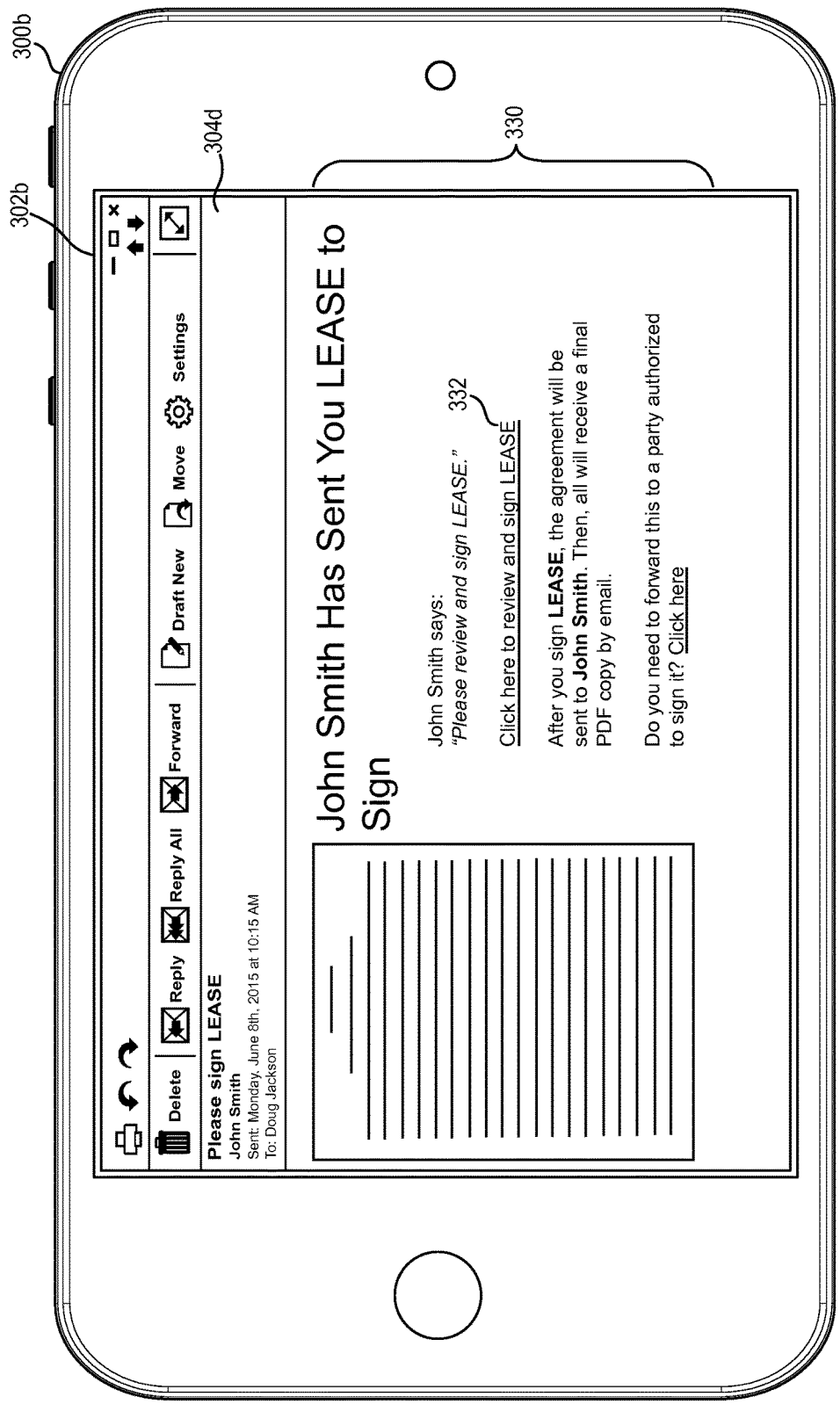

As mentioned above, the communication manager 210 can generate and send status updates to all parties associated with a particular electronic document. For example, as illustrated in FIG. 3E, in response to the electronic document owner (i.e., "John Smith") sending the uploaded electronic document 323 to a recipient (e.g., as specified via the controls within the upload GUI 304a shown in FIG. 3A), the communication manager 210 can generate and send an email to the electronic document recipient (i.e., "Doug Jackson") informing the recipient of the uploaded electronic document 323. As shown in the email GUI 304d provided by an email application on the touch screen display 302b of the client-computing device 300b (e.g., the client-computing device 106b associated with the user 112b), the communication manager 210 can generate and send an email message 330 including information regarding the uploaded electronic document 323. As shown in FIG. 3E, the email message 330 can identify the uploaded electronic document 323, provide a minimized preview of the uploaded electronic document 323, include the message input by the electronic document owner in the instruction control 310 of the upload GUI 304a (i.e., "Please review and sign LEASE"), and include information regarding next steps. Additionally, in at least one embodiment, the electronic document manager 104 masks the sender of the email, such that it appears the electronic document owner is sending the email, rather than the electronic document manager 104.

In one or more embodiments, the email message 330 also includes an electronic document hyperlink 332. For example, in response to being clicked by the recipient, the electronic document hyperlink 332 can direct the recipient to the uploaded electronic document 323. In one or more embodiments, the electronic document application 108b activates in response to the recipient clicking the electronic document hyperlink 332. Alternatively, clicking the electronic document hyperlink 332 can cause a web page within a web browser on the client-computing device 300b to open.

Figure 3F:
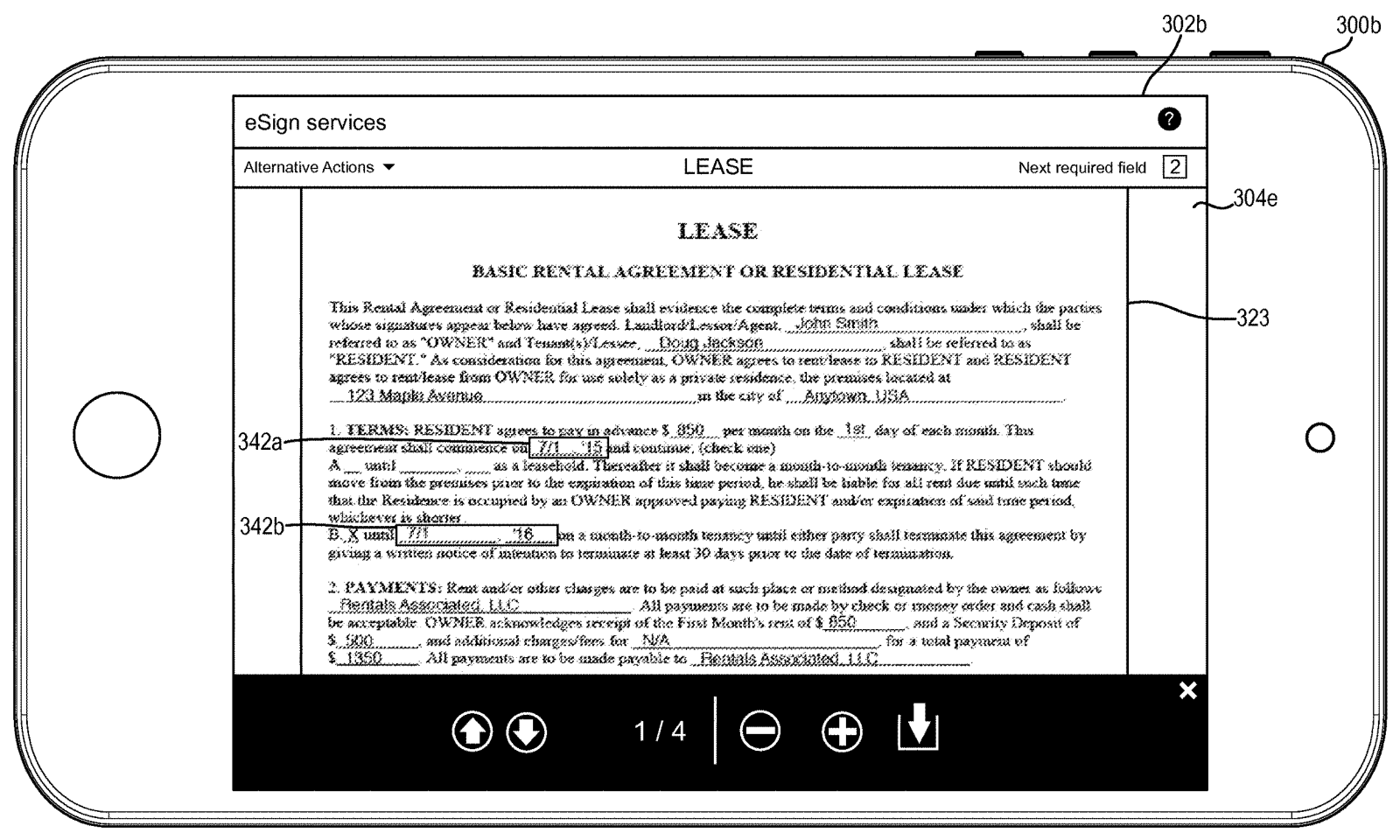
Figure 3G:
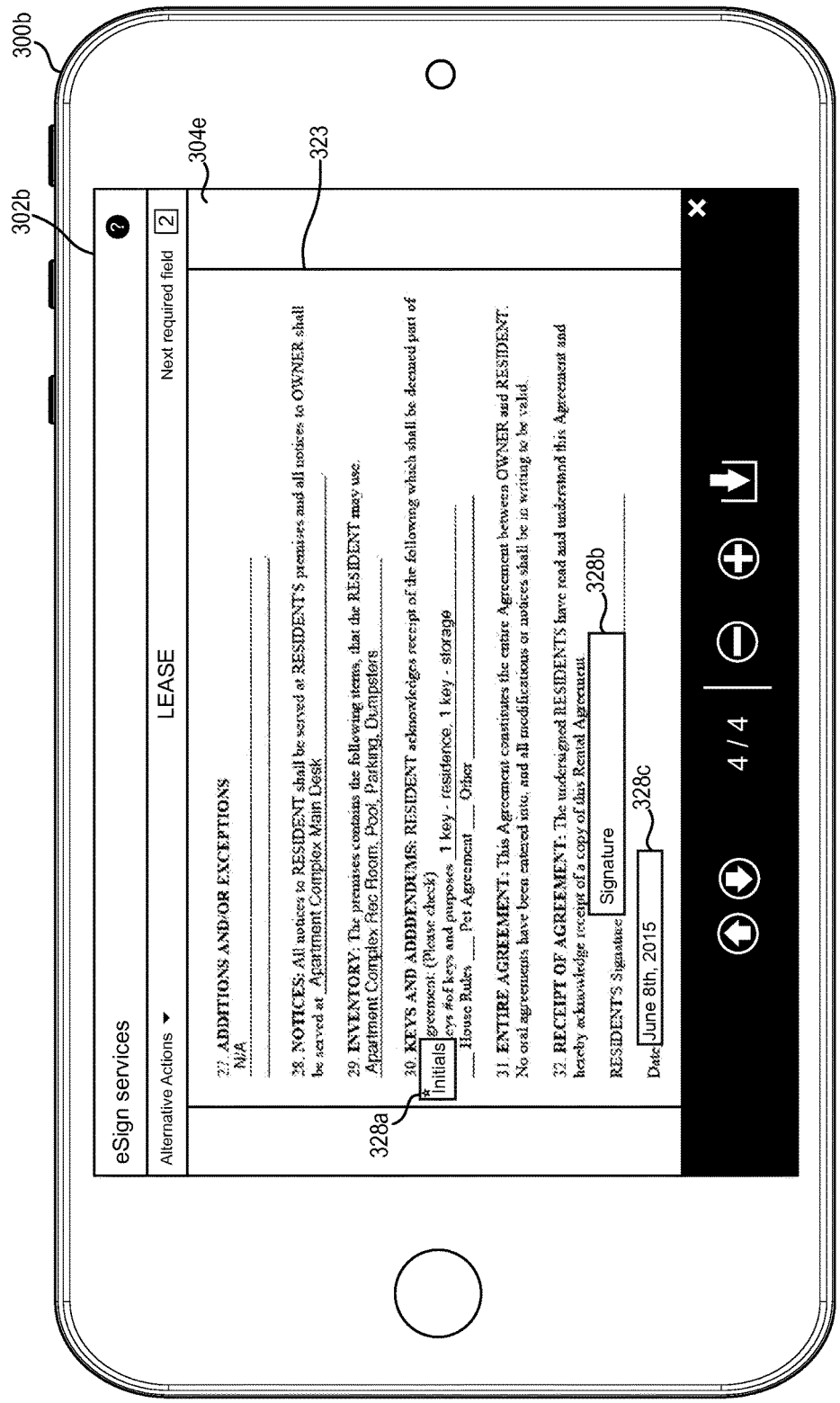

Regardless of the application that initializes or activates in response to the recipient clicking the electronic document hyperlink 332, the electronic document manager 104 can provide the uploaded electronic document 323 to the recipient within review GUI 304e, as shown in FIG. 3F. In one or more embodiments, the review GUI 304e allows an electronic document recipient (i.e., "Doug Jackson") to review the electronic document in its entirety as well as to add an electronic signature and/or additional notes and highlights to the electronic document. For example, after scrolling to the bottom of the uploaded electronic document 323, as shown in FIG. 3G, the recipient can select any of the signature fields 328a, 328b, or 328c in order to add electronic signatures, initials, etc. to the uploaded electronic document 323.

Figure 3H:
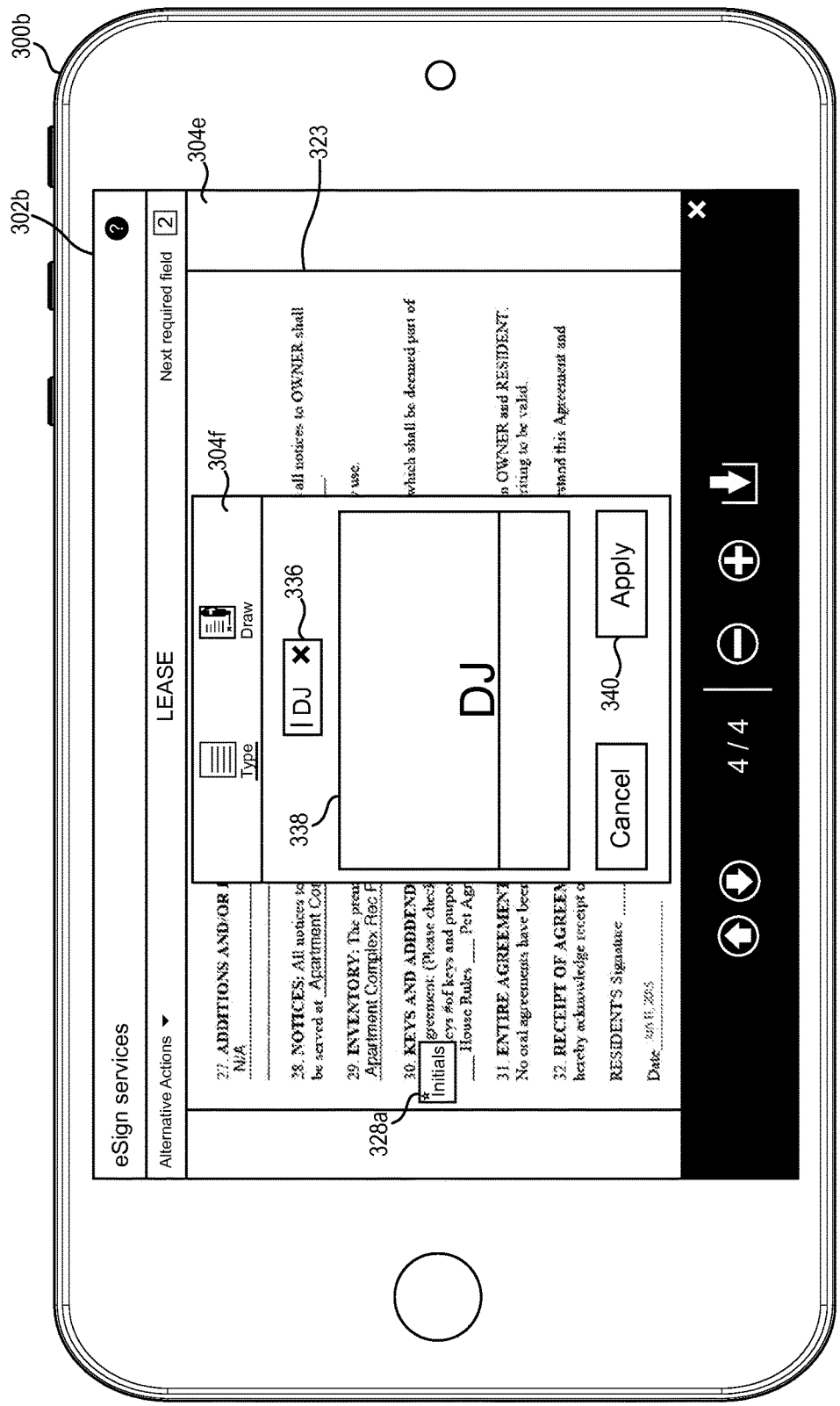

For instance, in response to the recipient selecting the signature field 328a, the electronic document manager 104 provides a signature GUI 304F, as shown in FIG. 3H. In one or more embodiments, the electronic document manager 104 can overlay the signature GUI 304F on the review GUI 304e within the touch screen display 302b of the client-computing device 300b. In at least one embodiment, the signature GUI 304f includes an input text box 336 and a display text box 338. For example, in response to the recipient inputting initials into the input text box 336 (e.g., via typing, touch gestures, etc.), the electronic document application 108b can provide a stylized version of the recipient's initials in the display text box 338. In response to the recipient clicking the apply button 340, the electronic document application 108b can replace the signature field 328a with the stylized version of the recipient's initials from the display text box 338, thus giving the appearance that the recipient hand-signed the uploaded electronic document 323.

In response to the recipient adding input to the signature field 328a, the electronic document application 108b can prompt the recipient to fill in the remaining signature fields 328b, 328c. In at least one embodiment, the electronic document application 108b auto-fills signature fields that are meant to contain standardized information, such as the date. For example, as shown in FIG. 3G, the electronic document application 108b can auto-fill the date into the signature field 328c.

Figure 3I:
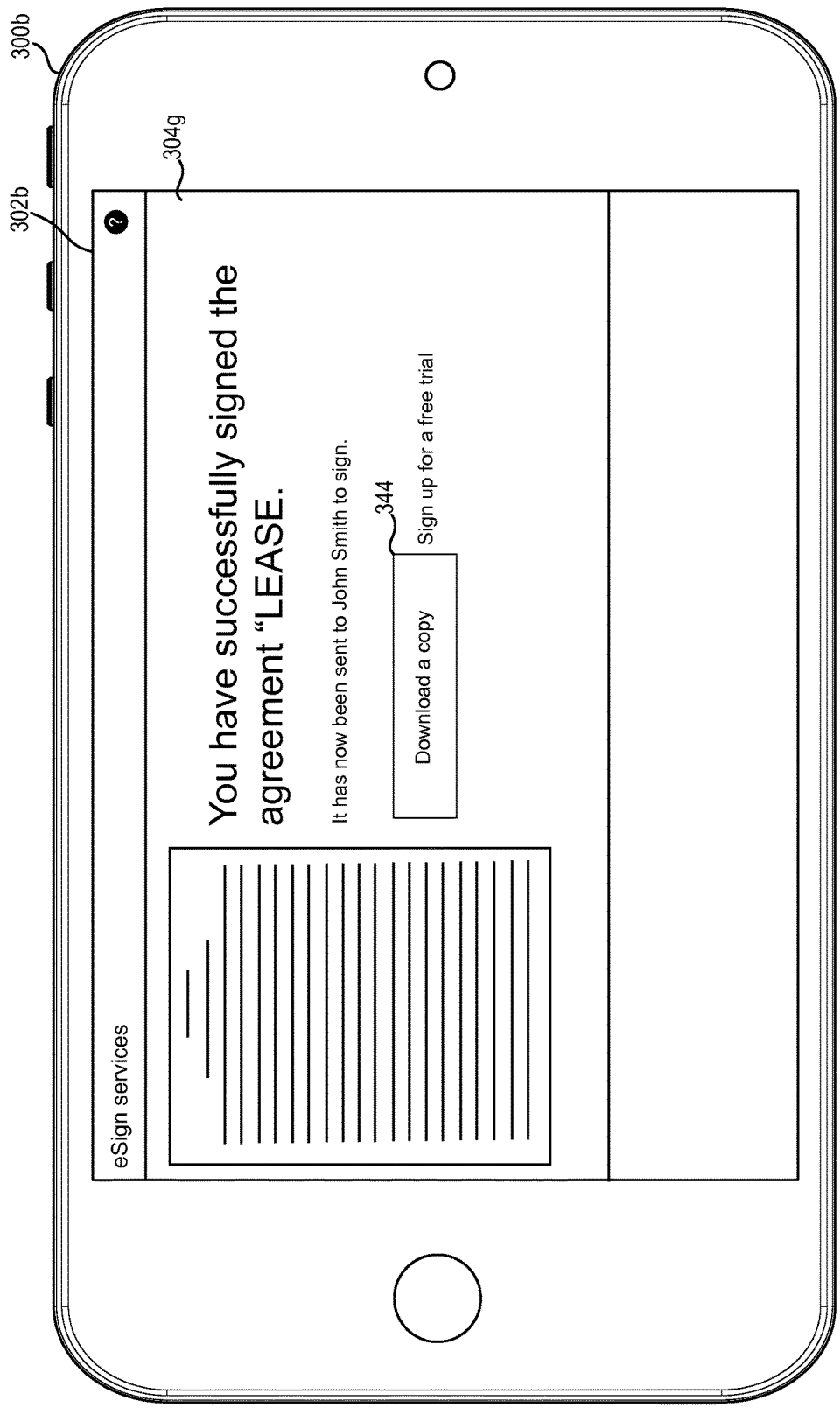

Once the recipient has added an electronic signature to the appropriate portions of the uploaded electronic document 323, the recipient can submit the now-signed electronic document to the electronic document manager 104. In response to receiving the signed electronic document, the communication manager 210 can generate and provide a recipient confirmation GUI 304g on the touch screen display 302b of the client-computing device 300b, as shown in FIG. 3I. In one or more embodiments, the recipient confirmation GUI 304g can include identifying information regarding the signed electronic document as well as a download control 344 that enables the recipient to download a copy of the signed electronic document for personal records.

As discussed above, the electronic document manager 104 can identify and store an electronic document based on expiration information contained within the electronic document. In one or more embodiments, once all necessary parties have electronically signed an electronic document, the document analyzer 212 can identify any expiration information associated with the electronic document prior to, or after, the electronic document being stored by the storage manager 214. For example, the document analyzer 212 can parse an electronic document and utilize natural language processing, optical character recognition, and other computerized linguistics techniques to identify expiration information.

So, with reference to the uploaded electronic document 323 (i.e., "LEASE.pdf"), the document analyzer 212 can parse the text within the uploaded electronic document 323 to identify expiration information. For example, as shown in FIG. 3F, the document analyzer 212 can parse the uploaded electronic document 323 into words and sentences to identify the expiration information 342a, 342b. As shown, the document analyzer 212 can utilize natural language processing to determine, when taken in context of surrounding words, the expiration information 342a (i.e., "7/1, '15) indicates when the term associated with the uploaded electronic document 323 begins. Similarly, the document analyzer 212 can utilize natural language processing to determine, when taken in context of surrounding words, the expiration information 342b (i.e., "7/1, '16) indicates when the term associated with the uploaded electronic document 323 ends (i.e., the expiration date for the uploaded electronic document 323).

Accordingly, in response to identifying the term and the expiration date associated with the uploaded electronic document 323, the storage manager 214 can generate a storage node with which to associate the uploaded electronic document 323. As discussed above, the storage manager 214 can generate a storage node for the uploaded electronic document 323 that includes the uploaded electronic document 323, any added or embedded electronic signatures or additional information, and any metadata associated with the uploaded electronic document 323. The storage manager 214 can then store the generated storage node at an index associated with the identified expiration date for the uploaded electronic document 323. Alternatively, the storage manager 214 can store the generated node at a location associated with another node that has the same expiration date as the generated node.

Figure 3J:
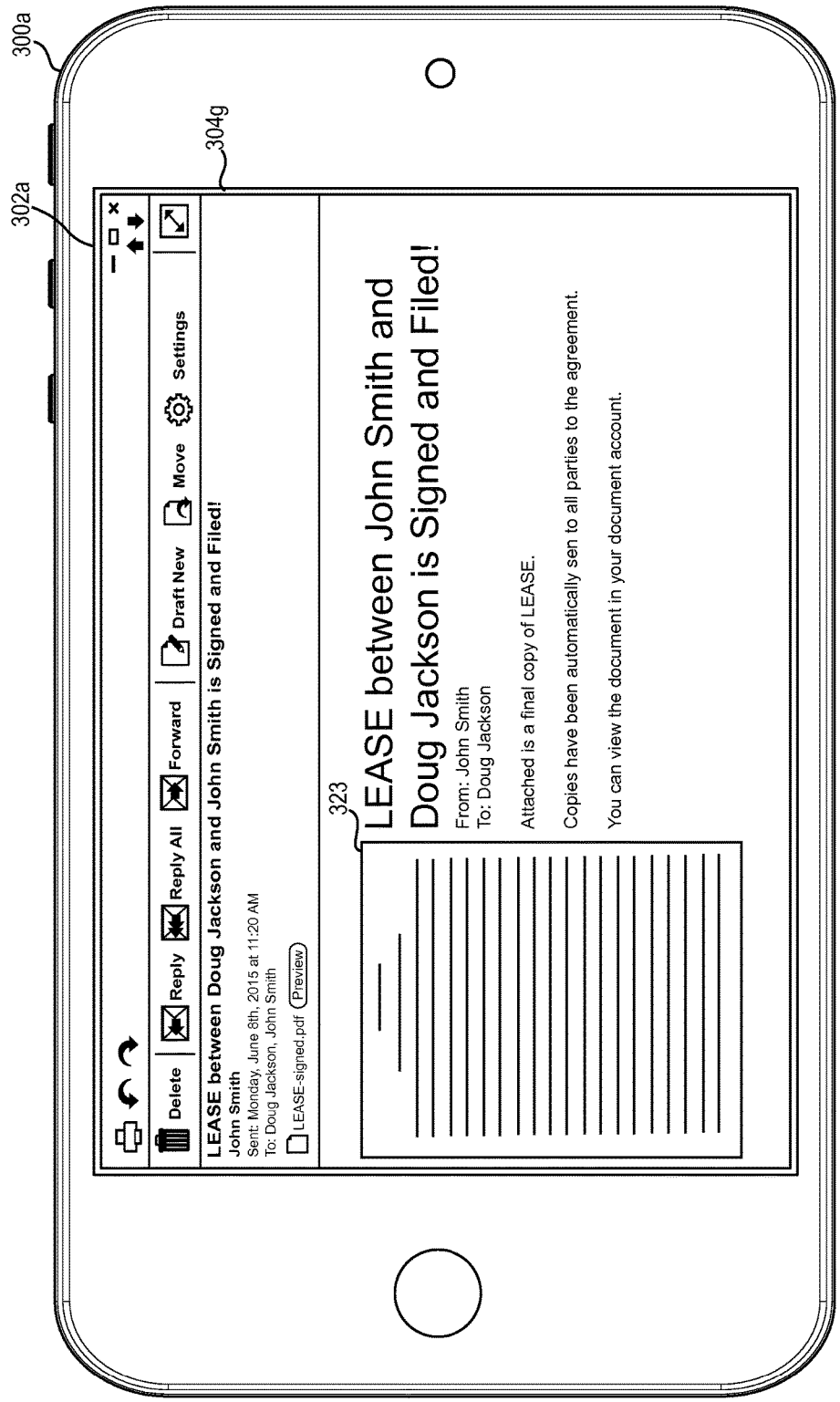

Once the storage manager 214 successfully stores the generated storage node associated with the uploaded electronic document 323, the communication manager 210 can generate and send an update regarding the status of the uploaded electronic document 323. For example, as shown in FIG. 3J, the communication manager 210 can generate and send an email to the electronic document owner (i.e., "John Smith"). In one or more embodiments, the electronic document owner can read the generated email via owner email GUI 304g. In at least one embodiment, the owner email GUI 304g includes identifying information associated with the uploaded electronic document 323 (e.g., electronic document title, minimized preview of the electronic document, etc.), a list of parties associated with the uploaded electronic document 323, final instructions regarding the uploaded electronic document 323, and a copy of the now-signed uploaded electronic document 323.

Figure 3K:
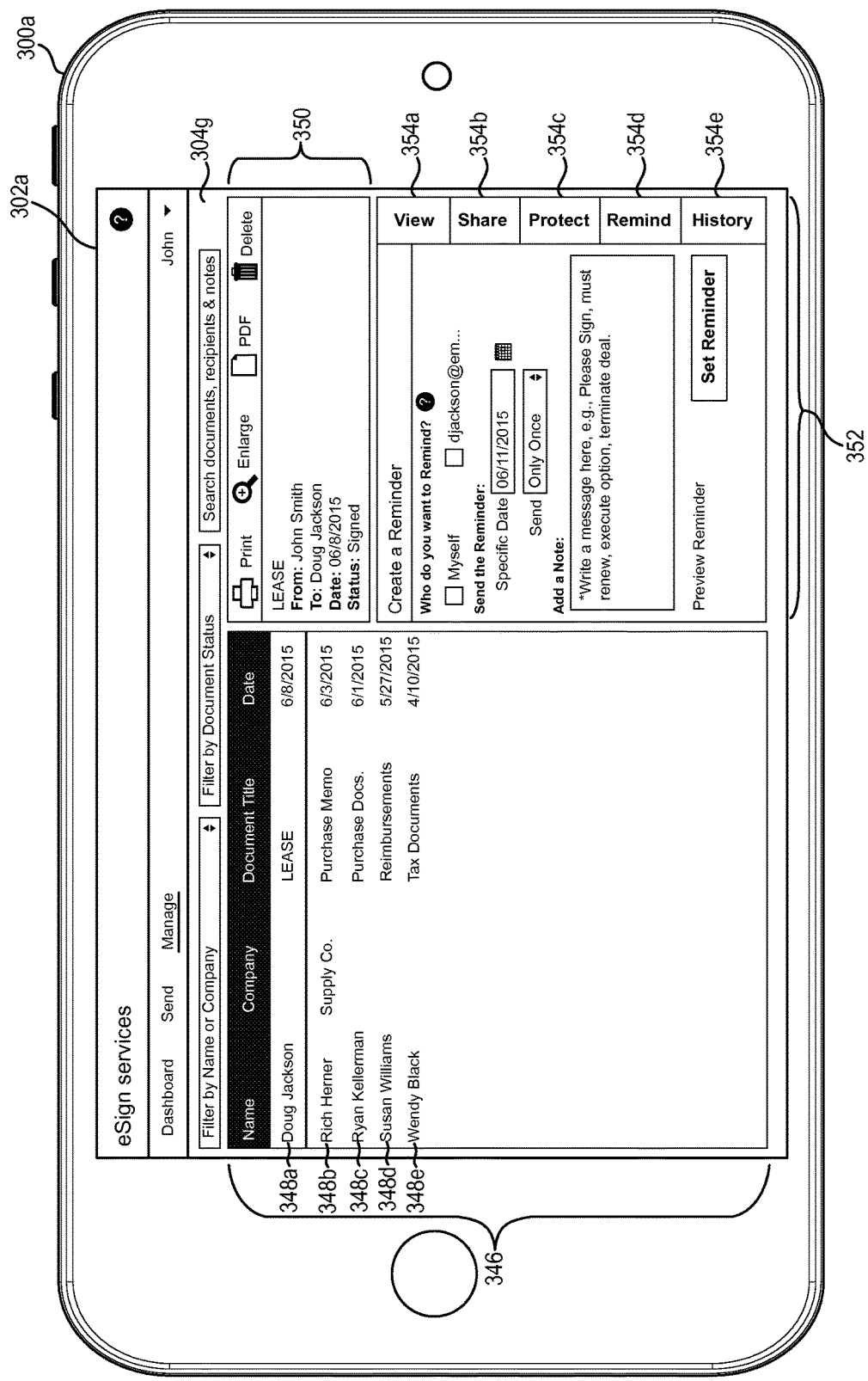

After an electronic document has been signed by all necessary parties and filed, the electronic document manager 104 can provide a management interface through which a user can view and edit details for all the user's filed electronic documents. For example, as shown in FIG. 3K, the electronic document manager 104 can provide a document review GUI 304g on the touch screen display 302a of the client-computing device 300a. In one or more embodiments, the document review GUI 304g can include a stored document list 346 listing stored document controls 348a, 348b, 348c, 348d, and 348e. In at least one embodiment, each of the stored document controls 348a, 348b, 348c, 348d, and 348e are representative of an electronic document associated with the user of the client-computing device 300a and filed by the electronic document manager 104.

As discussed herein, the association of signed electronic documents with storage nodes organized by date, can allow the electronic document management system 100 to provide users with the ability to easily review and manage contracts and other documents. For example, the stored document list 346 can provide a list of all document set to expire on a given day, month, or year. Thus, the stored document list 346 can allow an organization to find out what deals are outstanding and when they expire. Thus, the electronic document management system 100 can allow an organization to quickly and easily perform due diligence and manage current contracts and other agreements.

In response to the user of the client-computing device 300a clicking or tapping one of the stored document controls 348a, 348b, 348c, 348d, or 348e, the electronic document manager 104 can update the document review GUI 304g with information associated with the selected stored document control. For example, as shown in FIG. 3K, in response to the user selecting the stored document control 348a (i.e., representative of the electronic document "LEASE"), the electronic document manager 104 can update the overview control 350 and the options control box 352 with information specific to the document associated with the stored document control 348a. In one or more embodiments, the storage manager 214 stores and retrieves the information within the stored document control 348a, the overview control 350, and the options control box 352 as metadata within or associated with the storage node associated with the electronic document represented by the stored document control 348a, as described above.

In one or more embodiments, the overview control 350 includes identification information for the electronic document associated with the stored document control 348a. As shown in FIG. 3K, this information can include the name of the electronic document (i.e., "LEASE"), the parties related to the electronic document (i.e., "John Smith," "Doug Jackson"), the date the electronic document was filed (i.e., "Jun. 8, 2015"), and the status of the electronic document (i.e., "Signed"). In at least one embodiment, the overview control 350 includes interactive elements that allow the user of the client-computing device 300a to print, enlarge, view, and/or delete the electronic document associated with the stored document control 348a.

In one or more embodiments, the options control box 352 includes information related to the electronic document associated with the stored document control 348a, and organized according to the options tabs 354a, 354b, 354c, 354d, and 354e. For example, by selecting the options tab 354a (i.e., "view"), the electronic document manager 104 can provide a minimized view within the options control box 352 of the electronic document associated with the stored document control 348a. Furthermore, by selecting the options tab 354b (i.e., "share"), the electronic document manager 104 can provide additional controls by which the user can email, text, upload, etc. the electronic document associated with the stored document control 348a. By selecting the options tab 354c (i.e., "protect"), the electronic document manager 104 can provide additional controls by which the user can add encryption or password protection to the electronic document associated with the stored document control 348a. By selecting the options tab 354e, (i.e., "history"), the electronic document manager 104 can provide a list of time-stamped accesses, edits, electronic signatures, etc. related to the electronic document associated with the stored document control 348a, as well as a list of users who have performed any of these actions.

As illustrated in FIG. 3K, in response to the user selecting the options table 354d (i.e., "remind"), the electronic document manager 104 can provide additional controls by which the user can configure a reminder related to the electronic document associated with the stored document control 348a. As described above, in some embodiments, the electronic document manager 104 automatically determines when an electronic document will expire by analyzing the contents of the electronic document. In alternative embodiments, the electronic document owner can explicitly specify when the electronic document manager 104 should send a reminder related to the expiration of an electronic document. For example, by utilizing the controls illustrated in the options control box 352, as shown in FIG. 3K, the user can specify the contents, date, frequency, and recipients of a reminder or alert related to the electronic document associated with the stored document control 348a.

Figure 3L:
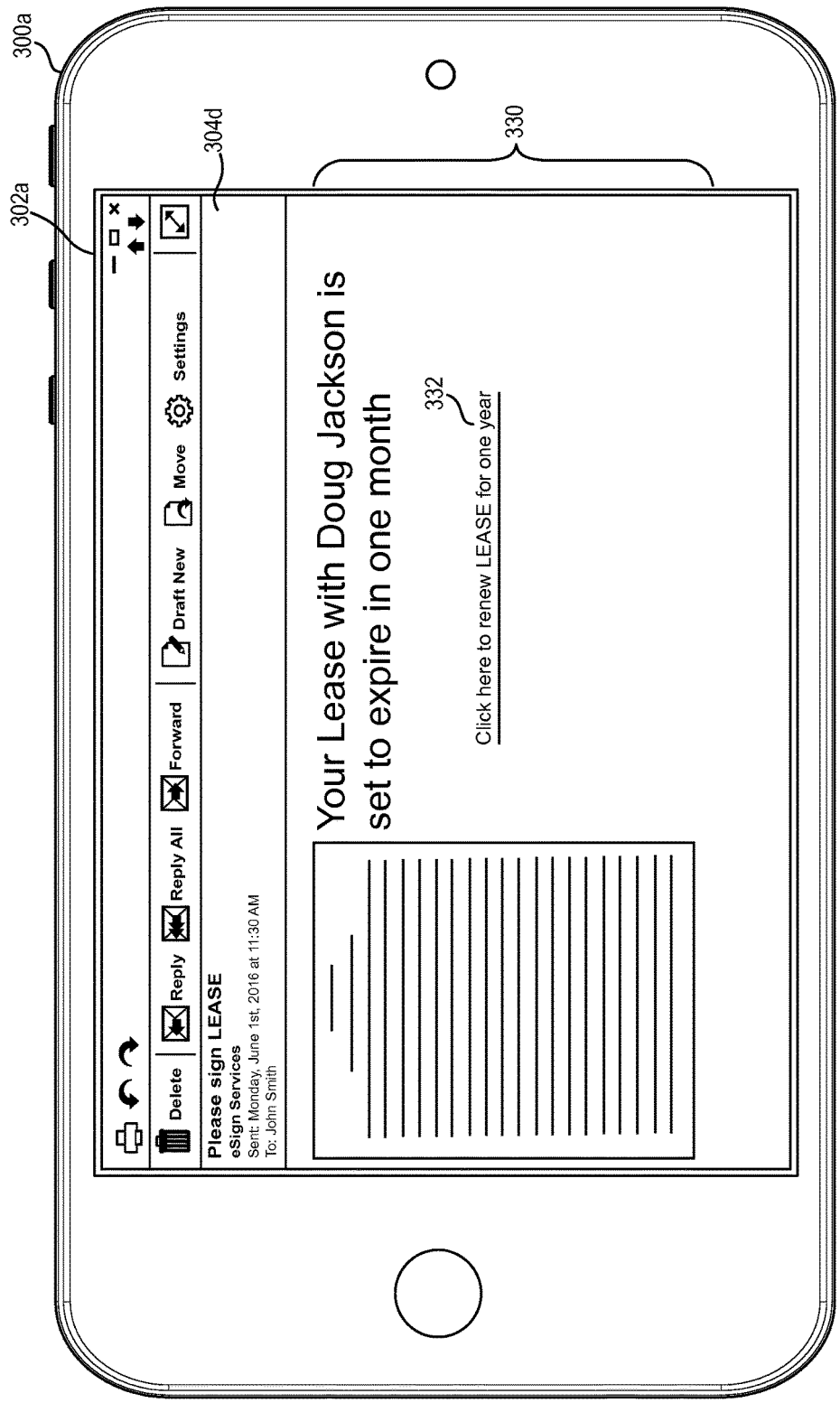

Regardless of whether a reminder or alert is automatically generated by the electronic document manager 104 or explicitly specified by the owner of the electronic document or a combination of the two (e.g., the document manager 104 may request confirmation of a suggested alert, or selects a date to which the owner of the electronic document has consented), the electronic document manager 104 can provide the reminder or alert to one or more parties associated with the electronic document. For example, as shown in FIG. 3L, the electronic document manager 104 can provide the reminder or alert as an email. In additional or alternative embodiments, the electronic document manager 104 can provide reminders and alerts as text messages, social media messages, pop-up notifications, etc.

As described above, in at least one embodiment, the storage manager 214 performs, at a regular interval (e.g., every day, every week, etc.), a storage node lookup based on the current date. It will be recalled that the expiration date identified by the electronic document manager 104 for the uploaded electronic document 323 (i.e., the "LEASE" as shown in FIG. 3B) was "7/1/16" (i.e., Jul. 1, 2016). It follows that the storage manager 214 generated a storage node for Jul. 1, 2016 and associated the uploaded electronic document 323 and its associated metadata with the storage node for Jul. 1, 2016 (along with any other documents managed by the system 100 with the same expiration date). Accordingly, if the storage manager 214 performed storage node lookups every month, the storage manager 214 would identify this generated storage node on Jun. 1, 2016, or one month prior to the expiration of the uploaded electronic document 323.

In response to identifying the storage node, the electronic document manager 104 can generate and send an alert or reminder for each electronic document stored in or otherwise associated with the storage node. For instance, as shown in FIG. 3L, the electronic document manager 104 can generate and send the email one month prior to the expiration date of the uploaded electronic document 323. In one or more embodiments, the electronic document manager 104 can send reminder or alert to the owner of the uploaded electronic document 323 (i.e., "John Smith"). Alternatively or additionally, the electronic document manager 104 can provide the reminder or alert to all parties associated with the uploaded electronic document 323 (i.e., "John Smith" and "Doug Jackson").

As mentioned above, the electronic document manager 104 can provide one or more parties associated with an expiring electronic document the option to renew the agreement laid out in the electronic document. For example, as shown in FIG. 3L, the electronic document manager 104 can provide an electronic document hyperlink 332 within the email message 330. In response to the user of the client-computing device 300a (i.e., "John Smith") selecting the electronic document hyperlink 332, the electronic document manager 104 can provide the review GUI 304e within the touch screen display 302a of the client-computing device 300a, as illustrated in FIG. 3M.

In order to renew an electronic document, the electronic document manager 104 can update all expiration information in the electronic document based on the term of the agreement laid out in the electronic document. For example, as discussed above, the electronic document manager 104 can utilize natural language processing, optical character recognition, and other techniques to identify expiration information in an electronic document. Similarly, the electronic document manager 104 can utilize these same techniques to generate new expiration information and update the contents of an electronic document. Additionally, the electronic document manager 104 can provide a copy of the renewed electronic document to all relevant parties to save for their own records.

Figure 3M:
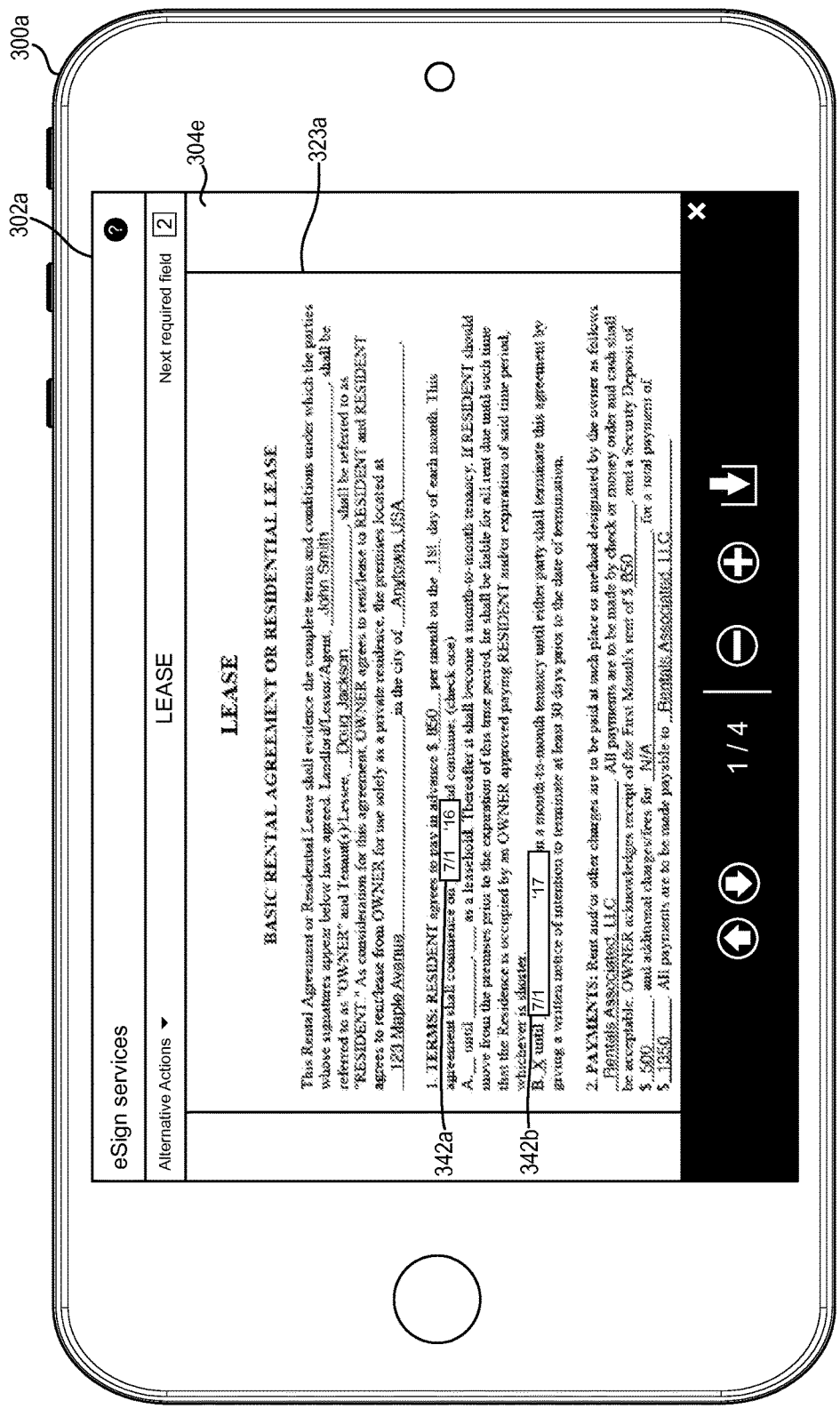

As illustrated in FIG. 3M, the electronic document manager 104 can update the expiration information 342a, 342b in the uploaded electronic document 323 in response to the electronic document owner selecting the electronic document hyperlink 332 (e.g., as shown in FIG. 3L) thereby creating an updated electronically signed document 323a, which the communication manager 210 can send to all parties associated with the uploaded electronic document 323. In order to update the expiration information 342a, 342b, the electronic document manager 104 can identify the term associated with the uploaded electronic document 323 (i.e., one year), and add the term to the current expiration date to determine the updated expiration information. The electronic document manager 104 can utilize natural language processing, optical character recognition, and the other techniques described above to update the starting date associated with the uploaded electronic document 323 (i.e., as shown in the expiration information 342a), and the expiration date associated with the uploaded electronic document 323 (i.e., as shown in the expiration information 342b).

Once the electronic document manager 104 has updated the expiration information associated with an electronic document, the electronic document manager 104 can provide the updated electronically signed document 323a for electronic signature to the same or additional parties, as described above. At this point, the electronic document management system 100 can allow the user to verify the updated date information in the electronic document 323. This can allow one of the parities to verify the term compared to the original term.

In any event, the parties can review and electronically sign the updated electronically signed document 323a. After all parties have signed the updated electronically signed document 323a, the electronic document manager 104 can generate a new node for the updated electronic document and its associated metadata and index the generated node according to the updated expiration information. Alternatively, the electronic document manager 104 can simply update the index of the existing node associated with the updated electronic document.

For ease in description, the foregoing description has been provided in relation to the tracking and facilitation of the renewal of a lease. One will appreciate in light of the disclosure herein that the electronic document management system 100 can facilitate the tracking and renewal of various types of agreements and due dates. For example, the electronic document management system 100 can detect and track multiple due dates within a single agreement and send alerts or reminders regarding each due date. More specifically, the electronic document management system 100 can track dates such as milestones, phases, and stages of an agreement.

In addition to the foregoing, the electronic document management system 100 can provide alerts or reminders to renew a document or simply to notify users of a pending deadline. For example, the electronic document management system 100 can intelligently detect and provide alerts regarding milestones that should take place according to the agreement. Then the electronic document management system 100 can further provide an alert that facilitates the renewal of the agreement in anticipation of the agreement expiring.

FIGS. 1-3M, the corresponding text, and the examples provide a number of different methods, systems, and devices for managing electronic documents. In addition to the foregoing, embodiments can also be described in terms of flowcharts comprising acts and steps in a method for accomplishing a particular result. For example, FIGS. 4 and 5 may be performed with less or more steps/acts or the steps/acts may be performed in differing orders. Additionally, the steps/acts described herein may be repeated or performed in parallel with one another or in parallel with different instances of the same or similar steps/acts.

Figure 4:
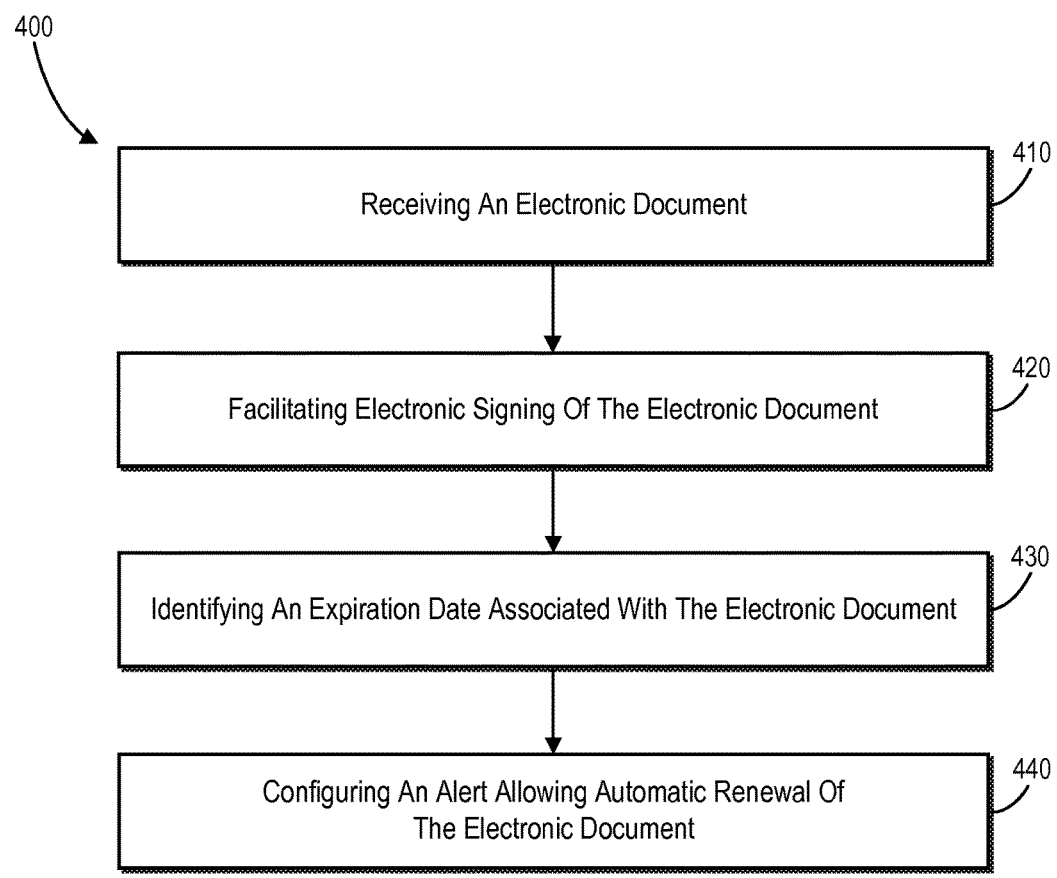
FIG. 4 illustrates a flowchart of a series of acts in a method of managing one or more electronic documents in accordance with one or more embodiments.

FIG. 4 illustrates a flowchart of one example method 400 of automatically facilitating renewal of electronically signed documents. The method 400 includes an act 410 of receiving an electronic document. In particular, the act 410 can involve receiving an electronic document for electronic signature. In one or more embodiments, the method 400 can further include receiving metadata associated with the electronic document.

Additionally, the method 400 includes an act 420 of facilitating electronic signing of the electronic document. In particular, the act 420 can involve facilitating, by the one or more servers, electronic signing of the electronic document by one or more parties. In particular, act 420 can involve sending the electronic document to the one or more parties. For instance, act 420 can involve sending an email with a link to an online version of the electronic document. Alternatively, act 420 can involve forwarding the electronic document to a client device for presentation via a native application installed on the client device.

Additionally, the method 400 includes an act 430 of identifying an expiration date associated with the electronic document. In particular, act 430 can involve analyzing the electronic document and the metadata associated with the electronic document for expiration information. For example, act 430 can involve parsing the electronic document and the metadata associated with the electronic document. Act 430 can further involve utilizing, in association with the parsed electronic document and metadata associated with the electronic document, one or more of natural language processing, optical character recognition, databases, grammars, or Internet lookups. In addition to the foregoing, in one or more embodiments, the steps of act 430 can be performed automatically, without human intervention.

The method 400 further includes an act 440 of configuring an alert allowing automatic renewal of the electronic document. In particular, the act 440 can involve configuring, by the one or more servers, an alert based on the identified expiration date that allows the one or more parties to automatically or manually renew the electronic document within a threshold amount of time of the identified expiration date. For example, act 440 can involve sending an alert with an option to renew the electronic document.

Furthermore, in one or more embodiments, the method 400 can include steps of creating, in response to receiving an electronic signature associated with the electronic document, a storage node associated with the electronic document, and organizing the storage node based on the identified expiration date associated with the electronic document. In at least one embodiment, organizing the storage node based on the identified expiration date associated with the electronic document includes storing the storage node within a data repository such that the storage node is retrievable based on the expiration date associated with the electronic document. In addition to the foregoing, in one or more embodiments, the steps of acts of method 400 are performed automatically, without human intervention.

The method 400 can also include acts of performing, at a regular interval, a storage node lookup based on the current date, and identifying, within a threshold amount of time from the current date, the storage node organized based on the identified expiration date associated with the electronic document. In at least one embodiment, configuring an alert associated with the electronic document is in response to identifying the storage node. Additionally, in at least one embodiment, the method 400 also includes, in response to configuring an alert associated with the electronic document, reconfiguring the electronic document for renewal. For example, reconfiguring the electronic document for renewal includes the expiration date associated with the electronic document. This can be done automatically, without human intervention. In another embodiment, the uploaded electronic document 323 is configured with new starting and expiration dates 342*a*, 342*b* (e.g., as seen in the updated electronically signed document 323*a*). In some embodiments, the method 400 also includes asking the user (e.g., the user 112*a*) to confirm the new starting and expiration dates 342*a*, 342*b*.

Figure 5:
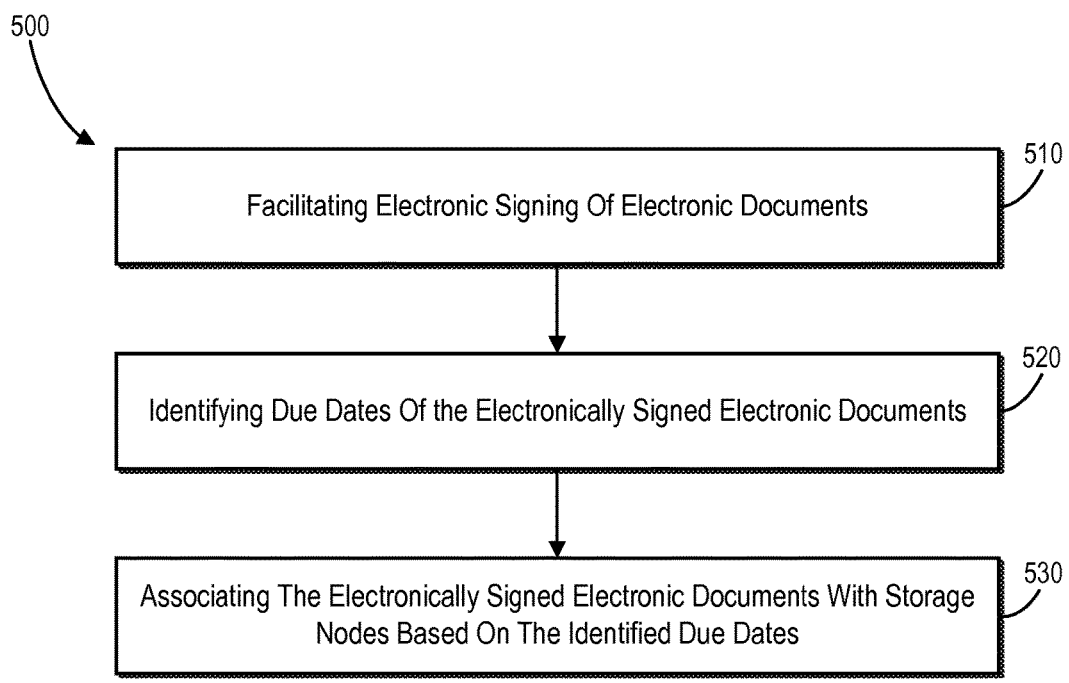
FIG. 5 illustrates a flowchart of a series of acts in another method of managing one or more electronic documents in accordance with one or more embodiments.

FIG. 5 illustrates a flowchart of one example method 500 of automatically facilitating renewal of electronically signed documents. The method 500 includes an act 510 of facilitating electronic signing of electronic documents. In particular, act 510 can involve sending the electronic document to the one or more parties. For instance, act 510 can involve sending an email with a link to an online version of the electronic document. Alternatively, act 510 can involve forwarding the electronic document to a client device for presentation via a native application installed on the client device.

Additionally, the method 500 includes an act 520 of identifying due dates of the electronically signed electronic documents. In particular, the act 520 can involve receiving confirmations of expiration dates for electronic documents of a first type of electronic document. Act 520 can then involve, based on the one or more confirmations of the expiration dates for the electronic documents of the first type, identifying one or more indicators of the expiration dates common to one or more of the electronic document of the first type of electronic document. Still further act 520 can involve identifying that a type of an electronically signed electronic document is the first type. Also, act 520 can involve parsing the electronically signed electronic document to locate the identified one or more indicators in the electronically signed electronic document. Additionally, act 520 can involve identifying an expiration date for the electronically signed electronic document based on the located one or more indicators in the electronically signed electronic document.

The method 500 also involves an act 530 of associating the electronically signed electronic documents with storage nodes based on the identified due dates. In particular, act 530 can involve associating, by the one or more servers, the electronically signed electronic documents with storage nodes based on the identified due dates of the electronically signed electronic documents. More particularly, act 530 can involve associating each storage node with a date and associating each electronically signed electronic document with an identified due date corresponding to the date associated with a particular storage node with the particular storage node.

The method of 500 can also involve automatically generating, by the one or more servers, alerts for each electronically signed electronic document associated with the particular storage node within a threshold amount of time from the date associated with the particular storage node. Generating the alerts can involve notifying the one or more parties of the due dates. More particular, the method 500 can involve including an option to renew the electronically signed electronic document in the alert.

Furthermore, the method 500 can include the step of renewing, in response to the option, the electronically signed document. In one or more embodiments, renewing the electronically signed document includes creating a new electronic document based on the electronically signed electronic document; calculating and including updated dates in the new electronic document based on dates in the electronically signed electronic document; and providing the new electronic document based on the electronically-signed electronic document to one or more parties that originally signed the electronic document for signing. In at least one embodiment, calculating and including updated dates based on dates in the electronically signed document can include:

parsing the electronically signed electronic document for expiration information to identify the expiration date, a start date, and a renewal term; and generating updated start and expiration dates based on the renewal term and the dates in the electronically signed document. This can be done automatically, without human intervention. The method 500 may further include sending the electronic document with the updated date, expiration information, and the term for the agreement, etc. to all parties associated with the electronic document for electronic signing.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) could be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, watches, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 6 illustrates a block diagram of an exemplary computing device 600 that may be configured to perform one or more of the processes described above. One will appreciate that one or more computing devices such as the computing device 600 may implement the analysis and visualization system. As shown by FIG. 6, the computing device 600 can comprise a processor 602, memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In particular embodiments, the processor 602 includes hardware for executing instructions, such as those making up a computer program. As an example and not by way of limitation, to execute instructions, the processor 602 may retrieve (or fetch) the instructions from an internal register, an internal cache, the memory 604, or the storage device 606 and decode and execute them. In particular embodiments, the processor 602 may include one or more internal caches for data, instructions, or addresses. As an example and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, the storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In particular embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from the computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications via various communication protocols. Examples of communication protocols that may be used include, but are not limited to, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML"), JavaScript Object Notation ("JSON"), and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment that sends and tracks electronic documents and facilitates electronic signing of electronic documents, a method for automatically facilitating renewal of electronically signed documents comprising:
   identifying, by one or more servers, an expiration date associated with an electronic document;
   identifying, within a data repository, a node bucket storing one or more existing storage nodes;
   generating a first storage node for the electronic document and storing the first storage node in the node bucket;
   in response to detecting a selection of an automatic renewal option associated with the electronic document, generating an updated version of the electronic document by generating updated start and expiration dates;
   in response to receiving a digital signature associated with the updated version of the electronic document, generating a hash based on the updated expiration date;
   associating the updated version of the electronic document with a second storage node corresponding to the updated expiration date;
   identifying, within the data repository, a node bucket associated with the generated hash; and
   storing the second storage node in the identified node bucket corresponding to the generated hash.

2. The method as recited in claim 1, wherein identifying the expiration date associated with the electronic document comprises analyzing the electronic document and metadata associated with the electronic document for expiration information.

3. The method as recited in claim 1, further comprising, in response to storing the second storage node in the identified node bucket corresponding to the generated hash, generating a history associated with the electronic document.

4. The method as recited in claim 2, wherein analyzing the electronic document and the metadata associated with the electronic document for expiration information comprises:

parsing the electronic document and the metadata associated with the electronic document; and
utilizing, in association with the parsed electronic document and the metadata associated with the electronic document, one or more of optical character recognition, natural language processing, neural networks, databases, grammars, or Internet lookups.

5. The method as recited in claim 3, wherein the history associated with the electronic document comprises a list of time-stamped accesses, edits, and electronic signatures associated with the electronic document.

6. In a digital medium environment that sends and tracks electronic documents and facilitates electronic signing of electronic documents, a method for automatically facilitating renewal of electronically signed documents comprising:
   identifying, by one or more servers, due dates of electronically signed electronic documents;
   associating, by the one or more servers, the electronically signed electronic documents with storage nodes;
   identifying, within a data repository, node buckets storing one or more existing storage nodes;
   storing the storage nodes in the identified node buckets;
   in response to detecting a selection of an automatic renewal option in an alert, generating an updated version of an electronic document associated with the alert by generating an updated start date and an updated expiration date;
   in response to receiving a digital signature associated with the updated version of the electronic document, generating a hash based on the updated expiration date;
   associating the updated version of the electronic document with a new storage node corresponding to the updated expiration date;
   identifying, within the data repository, a node bucket associated with the generated hash; and
   storing the new storage node in the identified node bucket corresponding to the generated hash.

7. The method as recited in claim 6, further comprising automatically generating, by the one or more servers and in response to a performed storage node lookup, alerts for each electronically signed electronic document stored in a particular node bucket within a threshold amount of time from a due date, the alerts notifying one or more parties of the due date associated with each electronic document stored in the particular node bucket.

8. The method as recited in claim 6, further comprising:
   further comprising tracking electronically signed documents for an organization;
   identifying one or more of the tracked electronically signed documents for the organization that are currently valid; and
   providing a list of the identified one or more tracked electronically signed documents for the organization that are currently valid via a user interface.

9. The method as recited in claim 6, further comprising:
   further comprising tracking electronically signed documents for an organization;
   identifying the tracked electronically signed documents for the organization that are due for renewal within a predefined time period; and
   providing a list of the identified one or more tracked electronically signed documents for the organization that are due for renewal within the predefined time period.

10. The method as recited in claim 6, further comprising, in response to storing the new storage node in the identified node bucket corresponding to the generated hash, generating a history associated with the electronic document associated with the selected alert.

11. The method as recited in claim 7, further comprising:
receiving confirmations of expiration dates for electronic documents of a first type of electronic document; and
based on the one or more confirmations of the expiration dates for the electronic documents of the first type, identifying one or more indicators of the expiration dates common to one or more of the electronic document of the first type of electronic document.

12. The method as recited in claim 11, wherein identifying the due dates of the electronically signed electronic documents comprises:
identifying that a type of an electronically signed electronic document is the first type;
parsing the electronically signed electronic document to locate the identified one or more indicators in the electronically signed electronic document; and
identifying an expiration date for the electronically signed electronic document based on the located one or more indicators in the electronically signed electronic document.

13. The method as recited in claim 10, wherein the history associated with the electronic document associated with the selected alert comprises a list of time-stamped accesses, edits, and electronic signatures associated with the electronic document.

14. The method as recited in claim 12, further comprising in response to generating the updated version of the electronic document, providing the updated version of the electronic document to one or more parties that originally signed the electronic document for signing.

15. The method as recited in claim 14, wherein generating the updated version of the electronic document comprises:
parsing the electronic document for expiration information to identify the expiration date, a start date, and a renewal term; and
generating the updated start date and the updated expiration date based on the renewal term and the dates in the electronic document.

16. A system comprising:
at least one processor; and
at least one non-transitory computer-readable storage medium storing instructions thereon that, when executed by at least one processor, cause the system to:
receive an electronic document for electronic signature;
facilitate electronic signing of the electronic document by one or more parties;
receive a signed version of the electronic document;
parse the signed version of the electronic document to identify an expiration date, a start date, and a renewal term associated with the electronic document;
generate a hash based on the expiration date associated with the electronic document;
associate the signed version of the electronic document with a first storage node corresponding to the expiration date;
identify, within a data repository, a node bucket associated with the generated hash based on the expiration data associated with the electronic document;
store the first storage node in the identified node bucket corresponding to the generated hash based on the expiration data associated with the electronic document;
perform a storage node lookup based on a threshold amount of time from a current date to identify the first storage node;
configure an alert based on the identified first storage node that includes a selectable option that allows the one or more parties to automatically renew the electronic document;
receive a selection of the selectable option;
generate an updated version of the electronic document associated with the first storage node by generating updated start and expiration dates based on the renewal term and dates in the signed version of the electronic document;
facilitate electronic signing of the updated version of the electronic document by the one or more parties;
receive a signed copy of the updated version of the electronic document;
generate a hash based on an updated expiration date associated with the updated version of the electronic document;
associate the updated version of the electronic document with a second storage node corresponding to the updated expiration date;
identify, within a data repository, a node bucket associated with the generated hash based on the expiration data associated with the updated version electronic document; and
store the second storage node in the identified node bucket corresponding to the generated hash based on the expiration data associated with the updated version electronic document.

17. The system as recited in claim 16, wherein the instructions, when executed by the at least one processor, further cause the system to:
parse the electronic document; and
utilize, in association with the parsed electronic document, one or more of natural language processing, neural networks, optical character recognition, databases, grammars, or Internet lookups.

18. The system as recited in claim 16, further storing instructions thereon that, when executed by the at least one processor, cause the system to, in response to storing the second storage node in the identified node bucket, generate a history associated with the electronic document.

19. The system as recited in claim 18, wherein the history associated with the electronic document comprises a list of time-stamped accesses, edits, and electronic signatures associated with the electronic document.

20. The method as recited in claim 4, further comprising:
facilitating electronic signing of the updated version of the electronic document with updated dates; and
receiving a signed copy of the updated version of the electronic document.

* * * * *